United States Patent
Marathe et al.

(10) Patent No.: US 12,086,037 B2
(45) Date of Patent: *Sep. 10, 2024

(54) SCALABLE LOW-LOSS DISASTER RECOVERY FOR DATA STORES

(71) Applicant: Oracle International Corporation, Redwood City, CA (US)

(72) Inventors: Virendra Marathe, Florence, MA (US); Alex Kogan, Burlington, MA (US); Ahmed Alquraan, Ontario (CA)

(73) Assignee: Oracle International Corporation, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/338,219

(22) Filed: Jun. 20, 2023

(65) Prior Publication Data
US 2023/0333945 A1 Oct. 19, 2023

Related U.S. Application Data

(63) Continuation of application No. 16/943,704, filed on Jul. 30, 2020, now Pat. No. 11,726,886.

(Continued)

(51) Int. Cl.
*G06F 1/14* (2006.01)
*G06F 1/10* (2006.01)
(Continued)

(52) U.S. Cl.
CPC ............ *G06F 11/1469* (2013.01); *G06F 1/10* (2013.01); *G06F 1/14* (2013.01); *G06F 11/1464* (2013.01);
(Continued)

(58) Field of Classification Search
CPC .......................... G06F 16/273; G06F 11/1469
See application file for complete search history.

(56) References Cited

U.S. PATENT DOCUMENTS

| 8,769,055 B2 | 7/2014 | Murphy et al. |
| 2016/0203168 A1 | 7/2016 | Gangadharappa et al. |
| 2018/0139118 A1 | 5/2018 | Johnson |

OTHER PUBLICATIONS

B. Ding, L. Kot, A. Demers and J. Gehrke, "Centiman: elastic high performance optimistic concurrency control by watermarking", Proceedings of the Sixth ACM Symposium on Cloud Computing, pp. 262-275 (Year: 2016).*

(Continued)

*Primary Examiner* — Kannan Shanmugasundaram
(74) *Attorney, Agent, or Firm* — Robert C. Kowert; Kowert, Hood, Munyon, Rankin & Goetzel, P.C.

(57) ABSTRACT

Systems and methods are disclosed to improve disaster recovery by implementing a scalable low-loss disaster recovery for a data store. The disaster recovery system enables disaster recovery for a linearizable (e.g., externally consistent) distributed data store. The disaster recovery system also provides for a small lag on the backup site relative to the primary site, thereby reducing the data loss by providing a smaller data loss window compared to traditional disaster recovery techniques. The disaster recovery system implements a timestamp for log records based on a globally synchronized clock. The disaster recovery system also implements a watermark service that updates a global watermark timestamp that a backup node uses to apply log records.

20 Claims, 16 Drawing Sheets

Related U.S. Application Data

(60) Provisional application No. 62/941,609, filed on Nov. 27, 2019.

(51) Int. Cl.
  *G06F 11/14* (2006.01)
  *G06F 11/20* (2006.01)
  *G06F 16/27* (2019.01)

(52) U.S. Cl.
  CPC ........ *G06F 11/2074* (2013.01); *G06F 16/273* (2019.01); *G06F 2201/82* (2013.01)

(56) References Cited

OTHER PUBLICATIONS

Misra et al. ("Misra"). "Enabling Lightweight Transactions with Precision Time," ASPLOS (Year: 2017).*
Misra, et al., "Enabling Lightweight Transactions with Precision Time," ASPLOS 2017, all pages.
U.S. Appl. No. 16/943,704, filed Jul. 30, 2020, Marathe, et al.

* cited by examiner

SCALABLE LOW-LOSS DISASTER RECOVERY FOR DATA STORES

This application is a continuation of U.S. patent application Ser. No. 16/943,704, filed Jul. 30, 2020, which claims benefit of priority of U.S. Provisional Patent Application No. 62/941,609, filed Nov. 27, 2019, which are hereby incorporated by reference herein in their entirety.

FIELD OF THE DISCLOSURE

Background

This disclosure relates generally to systems and methods for scalable low-loss disaster recovery for data stores, and more particularly, to systems and methods for using write-ahead logs and timestamps to enforce persistence for a data store.

Description of the Related Art

Disaster recovery is an important feature that many distributed systems implement. Snapshot shipping is one technique that may be used for disaster recovery. However, this technique may result in significantly large data loss windows in the event of a disaster (e.g., minutes, hours, or even days). Another technique uses asynchronous log shipping in an attempt to reduce the amount of data loss that occurs during a disaster recovery. However, asynchronous log shipping does not work correctly for linearizable (externally consistent) data stores because it does not enforce ordering on the backup site based on read-write dependencies embodied by reads and writes issued by client requests. Synchronous geo-replication is a technique that may be used for disaster recovery, but this technique results in a significant performance cost (e.g., costs associated with replication).

SUMMARY

Systems and methods for implementing scalable low-loss disaster recovery for data stores are contemplated.

In one embodiment, a disaster recovery system may employ a combination of asynchronous log replication from a primary site to a backup site, globally synchronized clocks, batching, and/or a watermark service to address various challenges associated with providing consistency of the backup site's state, recovery from failures, and scalability. In particular, in one embodiment, a primary shard at a primary site of a distributed data store may receive an update (e.g., from a client of the distributed data store). The primary shard may append the update to a primary log (e.g., a write-ahead log). The append may include addition of a timestamp to the update.

In embodiments, the timestamp indicates a time returned by a global clock used for the entire primary site (e.g., referenced by each of the primary shards of the primary site). In some embodiments, to ensure that timestamps remain in the correct order, the maximum clock drift for the global clock is less than a completion time to write a given update to the primary shard and at least a threshold number of replicas of the primary shard as part of a given commit. After the update is appended, the primary shard commits the update (e.g., after replicating/writing the update to a threshold number of replicas of the primary shard). The primary shard may then asynchronously send the update to a backup shard at a backup site. The backup shard may receive the update, append the update, commit the update, and determine a global watermark timestamp that indicates a most recent time up to which all of the of backup shards have committed updates (e.g., using a global watermark service described herein). The backup shard may apply the update (and zero or more other updates) to the backup shard based on the global watermark timestamp, wherein the timestamp of the update (and the zero or more other updates) is less than or equal to the global watermark timestamp. As described herein, use of a global watermark timestamp provides an efficient technique for a large number of backup shards to maintain an up-to-date backup state.

These and other embodiments will become apparent upon reference to the following description and accompanying drawings.

Figure 1:
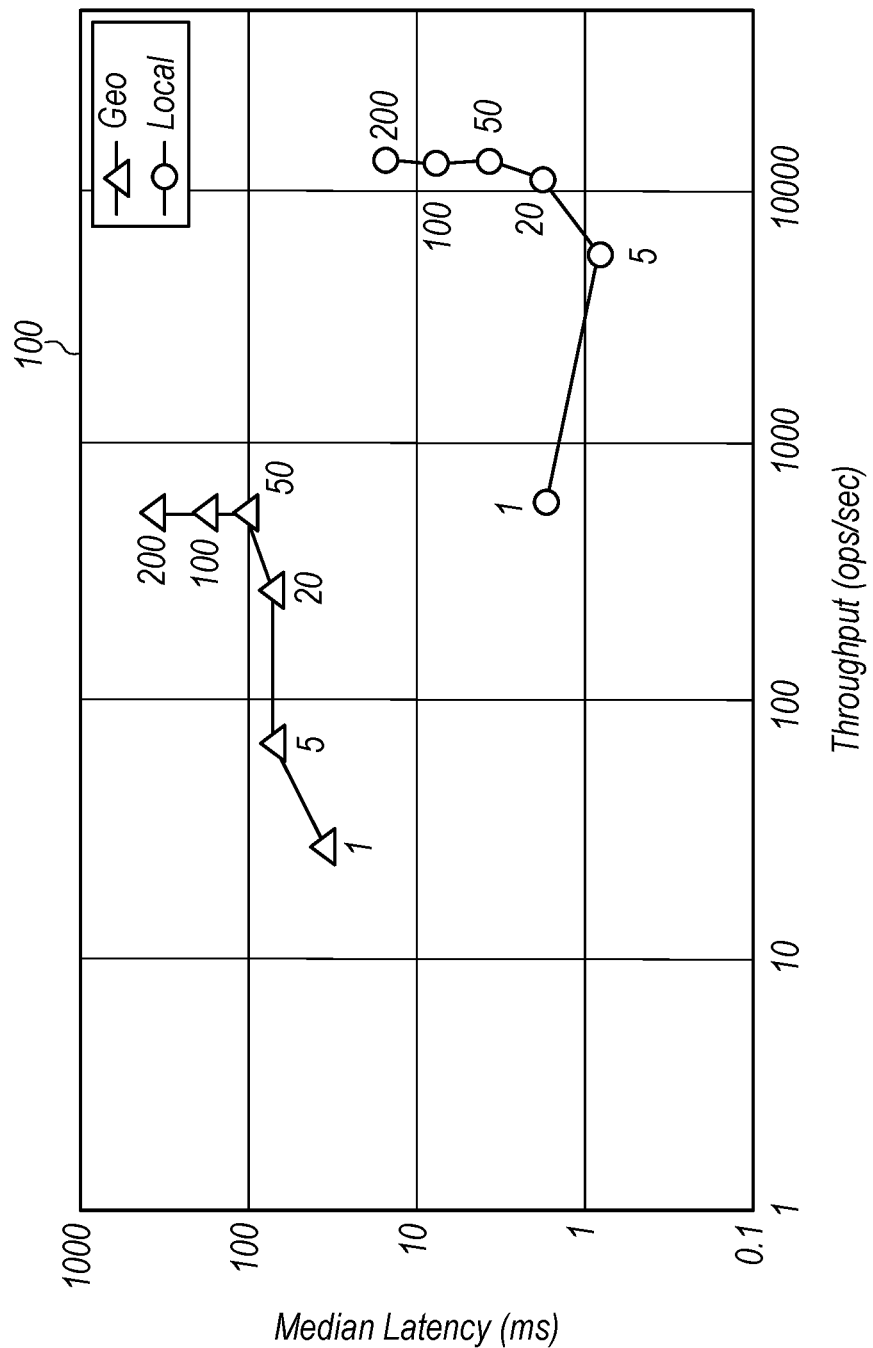
FIG. 1 illustrates results for experiments using a highly available Key-Value (K-V) store (LogCabin) that uses the Raft consensus protocol for replication, according to some embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

The disclosed disaster recovery (DR) system (herein referred to as "SysDR") may implement scalable low-loss disaster recovery for a data store. SysDR may provide improvements over traditional DR techniques for database systems in at least two ways: (i) SysDR may enable DR for a linearizable (e.g., externally consistent) distributed data store, and (ii) SysDR may maintain a relatively small lag (e.g., in the order of milliseconds) on the backup site relative to the primary site, thereby restricting the data loss window (e.g., due to disasters) to milliseconds or less. As described herein, traditional techniques for DR that use log shipping are unable to work correctly for linearizable distributed data stores. In various embodiments, SysDR may be implemented for any type of suitable data store/linearizable data store (e.g., distributed data stores, production distributed systems, etc.).

In embodiments, SysDR may employ a combination of asynchronous log replication, globally synchronized clocks, batching, and/or a watermark service to address various challenges, including challenges associated with providing consistency of the backup site's state, recovery from failures, and scalability. In some embodiments, log records/updates that are asynchronously sent (e.g., replicated) from a primary site (e.g., a primary shard or node) to a backup site (e.g., to a backup shard or node) may be sent to the backup site at any particular time after the log records/updates have been written (e.g., appended, committed, and/or applied at the primary site). Therefore, the backup site may receive any number of log records/updates from the primary site at any time after they have been written at the primary site. In some embodiments, the received log records/updates may be written (e.g., appended, committed, and/or applied) at the backup site at any subsequent time after they are received at the backup site (depending on a schedule, event, etc.).

In embodiments, using synchronous backup techniques, a given update may need to be written to the primary site and the backup site at the same time (or approximately the same time). Synchronous backup systems may take considerably longer to back up data compared to asynchronous backup systems. For example, if there is a relatively long delay to transmit data between a primary and backup site (e.g., due to a long physical distance between the remote sites), the primary site may need to wait for a relatively long time to receive acknowledgment that a log record/update has also been written to the backup site (e.g., so that the primary site can then send another log record/update). Asynchronous backup techniques may avoid these delays, since log records/updates may be sent/replicated to the backup site at any particular time after the log records/updates have been written to the primary site. As described herein, embodiments may employ asynchronous log replication, globally synchronized clocks, batching, and/or a watermark service to address challenges associated with providing consistency of the backup site's state, recovery from failures, and/or scalability.

Furthermore, SysDR may be designed to be deployable as an "add-on" module in an existing distributed data store with few modifications to the original code base. For example, SysDR may plug into the existing data store via its logs that are used by the data store for reliable, highly available persistence of updates. In an embodiment, SysDR extensions to a 32-sharded version of an open source key-value store (e.g., "LogCabin," etc.) may provide for an extremely small data loss window (as low as approximately 13 milliseconds or less), which can be achieved at zero or near-zero performance penalty on the primary data store.

The importance of distributed systems has grown in the Cloud era. In embodiments, distributed systems may provide the desirable scale-out and fault tolerance capabilities associated with distributed infrastructures and services hosted by Cloud vendors. In embodiments, DR is a feature desired for various distributed systems (e.g., production distributed systems). DR may enable tolerance of data center wide outages (e.g., where the original data center is rendered inoperable for extended periods). DR of a distributed data store (e.g., databases, key-value stores, file storage, etc.) may be enabled by creating an additional copy of the data store at a remote backup site (e.g., data center) while the primary site's data store is online. The backup copy, which may lag behind the primary data store, may serve as the new basis of the data store to create and/or start a new primary data store. In embodiments, the latest data updates at the old primary data store may be lost during disasters.

In some traditional techniques, the primary means of DR is through snapshots. For example, a data store snapshot may be asynchronously created and replicated to the backup site. While a sufficient solution for many use cases, a limitation of this approach is the potentially large window of data loss (seconds, minutes, even hours/days) between the time the last snapshot was taken and replicated, and the time the disaster occurred.

Another traditional technique is to build synchronous geo-replicated data stores, which may trivially tolerate data center wide failures, in embodiments. A benefit of geo-replicated data stores is that zero or near-zero data loss may be guaranteed even in the presence of data center wide outages. However, synchronous replication across data centers may have a significant performance cost in the data store's critical path.

FIG. 1 illustrates results 100 for experiments using a highly available Key-Value (K-V) store (LogCabin) that uses the Raft consensus protocol for replication, according to some embodiments. FIG. 1 compares performance between synchronous intra (local) and inter (geo) data center replication (3-way). As shown, the inter data center replicated LogCabin cluster performs over an order of magnitude worse than the intra data center cluster. The performance degradation reflects the effects of geographic distance between machines interacting in the replication protocol.

As shown in FIG. 1, intra data center replication may be attractive from a performance perspective. Various embodiments may be implemented with respect to intra data center wide distributed data stores. However, some embodiments may instead be implemented with respect to inter data center wide distributed data stores. Embodiments herein describe a DR scheme that may asynchronously replicate updates to a backup site with a near zero lag. Therefore, in various embodiments, in the event of a disaster at the primary site, the DR scheme may lose updates from just the last few milliseconds.

Some traditional techniques may asynchronously ship log records generated by the primary data store to the backup site. While this approach may be used to greatly reduce the data loss window for a data store, traditional techniques may only support serializability or more relaxed consistency models for data stores. In embodiments described herein, SysDR may plug into any linearizable (or non-linearizable) distributed data store that uses a write-ahead log to apply changes to its state. SysDR may asynchronously replicate and apply the logs to a designated backup site. SysDR may preserve linearizability by tracking temporal order between log records using globally synchronized distributed clocks. In embodiments, SysDR assumes that the data store can tag each log record with a timestamp derived from the distributed clock. This timestamp may be used to identify a partial order between updates. Log records may be applied to the backup site in tagged timestamp order. In embodiments, batching and synchronization may be used (using a "watermark service") on the backup site to efficiently apply the log records. Backup work may happen continuously in the background and off the primary data store's critical path.

In various embodiments, SysDR may provide near zero lag asynchronous backup of a linearizable distributed data store. Using traditional techniques, the order of log replication may lead to an update order at the backup site that is inconsistent with the update order observed at the primary site. In embodiments, SysDR may avoid this issue by using timestamps generated by fine-grain globally synchronized distributed clocks.

Various embodiments employ several techniques such as pipelining, concurrency, batching, and a coarse-grain synchronization based watermark service. Moreover, in embodiments, SysDR is pluggable in any distributed data store with relatively few changes to the implementation of the data store.

Data Store Architecture—Primary Data Store

In embodiments, the distributed data store provides high-availability using synchronous replication. The data store may be logically partitioned into a multitude of non-overlapping shards. Multiple shards may co-habit the same physical machine. Each shard may be synchronously replicated for high availability. In embodiments, a given shard's replica set contains a collection of copies of the shard, referred to as "replicas," hosted on different machines. A replica set may contain a single leader replica that processes the updates directed to the shard and propagates them to the rest of the replicas, called "followers," in its replica set. Leaders may be chosen statically or dynamically using a leader election algorithm. The replication scheme itself may have a simple primary-secondary form, or may rely on a more sophisticated consensus protocol such as "Paxos" or "Raft."

Figure 2:
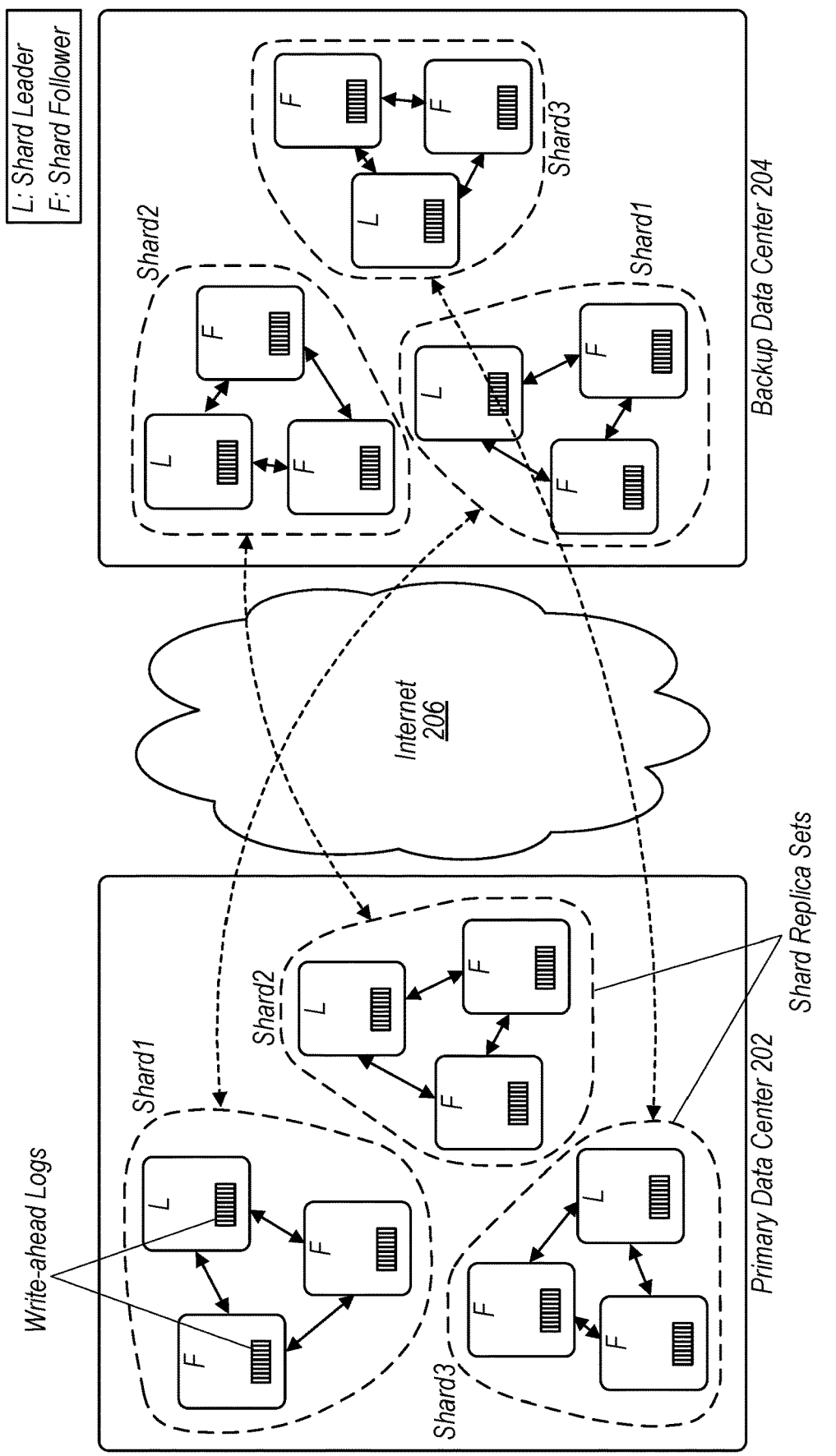
FIG. 2 is a block diagram illustrating a distributed data store with three shards, each shard 3-way replicated, according to some embodiments.

FIG. 2 is a block diagram illustrating a distributed data store with three shards, each shard 3-way replicated, according to some embodiments. As shown, the primary data store resides on a single data center 202, and its backup resides on a geographically distant backup data center 204. In the depicted embodiment, the data centers may communicate using a wide-area network 206 (e.g., the Internet). The primary-backup shard mappings, shown by dotted double-header arrows, are logical. As depicted, each shard has a designated leader replica and two follower replicas for fault tolerance.

In embodiments, updates to a given shard are first appended to a local write-ahead log containing logical update records. The leader performs replication by sending log records to its followers. In embodiments, replication is synchronous. After replication completes, the updates may propagate to the shard's state machine layer. In some embodiments, the data store contains the mechanics to instantiate a new follower copy of a shard from its existing replica set. This may be done in several ways, including copying over snapshots of the shard, or funneling the shard copy through the log by re-writing all objects/blocks in the shard with their existing values. The data store may tolerate transient network problems such as unreliable delivery local outages, asynchrony, etc. In some embodiments, a fail-stop failure model for machines may be used by the data store, in which machines may stop working, but will not send erroneous messages.

Data Store Architecture—the Backup Site

In embodiments, infrastructure at the backup site is the same or similar to that on the primary site. The backup site may host a logical mirror copy of the primary site. Therefore, the backup site may have logically identical shards, and use identical algorithms and schemes to control data it receives from the primary site (e.g., same algorithms for replication, leader election, failure detection, etc.). The backup site may or may not have a different physical structure. For example, relative locations (host machines) of replicas, replication factor, and network topology may be different.

In some embodiments, the network between the primary and backup sites may be unreliable and asynchronous, as there may be no guarantees that packets will be received in a timely manner or even delivered at all, and there may be no limit on the time a machine takes to process a packet Like the primary machines, the backup machines may also have a fail-stop failure model. In embodiments, a disaster may be declared (manually by the data center administrator), during an outage. The backup site may be informed about the disaster by an out-of-band mechanism that will trigger fail-over steps.

Issues Associated with Traditional Techniques

As discussed above, one of the traditional techniques is an asynchronous log record shipping technique for backing up a distributed data store. That technique enforces ordering between log records from different logs by tracking explicit data dependencies between them. For instance, a traditional technique for asynchronous log record shipping tracks the order between log records of distributed transactions by explicitly tracking their write-write and write-read ordering dependencies, via overlapping read and write sets of transactions (e.g., using Lamport clock style distributed counters). The dependencies are used to apply transactions in the correct order at the backup site.

While the above dependency tracking may be sufficient for serializable updates, it is insufficient for linearizable updates. For example, ordering dependencies may not necessarily be implied by writes and reads; they may be enforced by logic of the application that uses the data store. Consider an application A that uses a data store D. A issues a write to object OS1 that resides in shard S1. After the write completes, A issues a write to object OS2 that resides in another shard S2. Thus, A has enforced an externally visible happens-before relation between the two writes. This relation is guaranteed by a linearizable data store since linearizability guarantees that an operation takes effect in real-time between its invocation and response.

Now consider the problem of backing up the two writes. The above happens-before relation should be preserved by the backup system. It however cannot be captured by simply tracking overlapping reads and writes, since there are no overlaps in the example. The order is enforced by A's program logic, which is opaque to D. Thus, the backup site cannot correctly determine the order in which writes to OS1 and OS2 must be applied. In general, the two writes may be causally ordered in arbitrarily complex ways that involve multiple threads of execution within A, and even multiple applications that communicate with each other via an out-of-band communication channel.

Interestingly, reads can also enforce an order between concurrent writes. Consider two threads of execution in application A. Now consider a scenario where one thread writes to OS1 and the other thread concurrently writes to OS2. Since the writes are concurrent, no specific order is imposed on them. However, if a third thread of execution happens to read the two objects in a specific order, say OS1 followed by OS2, the reads may imply an order in which the two writes need to be backed up. For instance, if the read of OS1 returns its new value, whereas the read of OS2 returns its old value, backing up the two writes in the opposite order—OS2 followed by OS1—may lead to an inconsistent view in the backup site if the primary site fails between the two backups. This "visibility based" order should be correctly preserved in the backup.

Another traditional technique forces the application to explicitly track ordering dependencies, and communicate them to the data store. This however may entail a prohibitively intrusive change in the application, since the dependency tracking may be hard, even infeasible, in sufficiently complex applications.

Figure 3A:
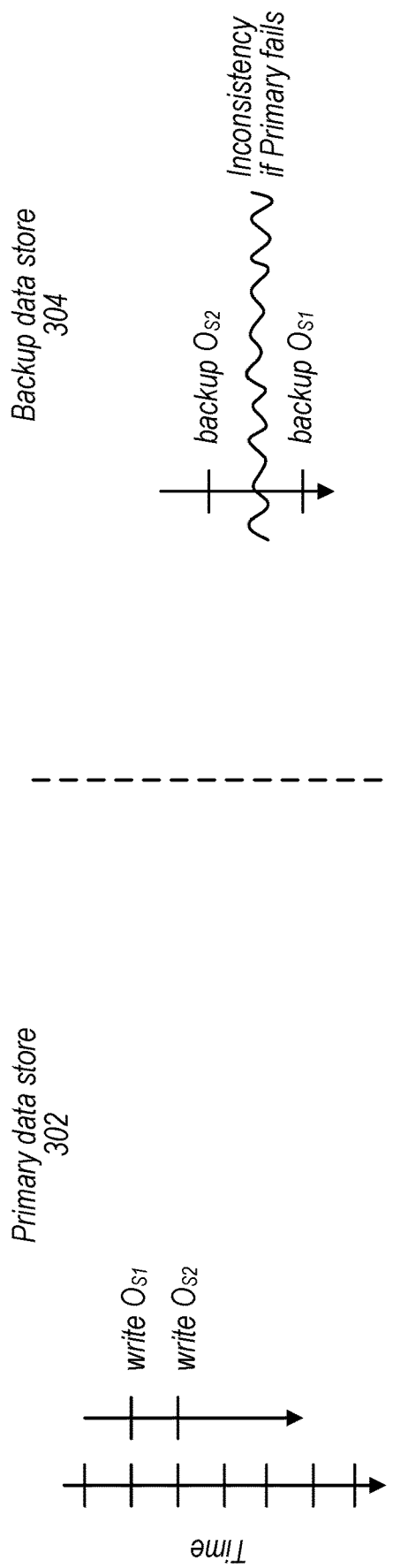
FIG. 3A illustrates violation of write order enforced by direct/indirect causality when using a primary data store 302 and a backup data store 304, according to some embodiments.
Figure 3B:
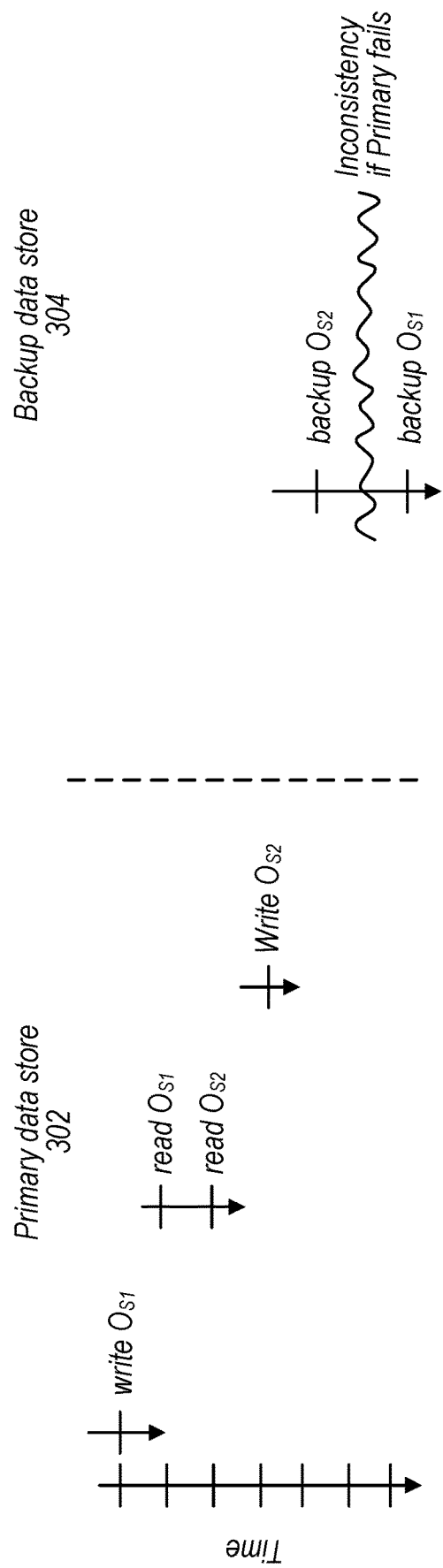
FIG. 3B illustrates violation of write order implied by concurrent reads when using a primary data store 302 and a backup data store 304, according to some embodiments.

FIGS. 3A and 3B depict both of the above scenarios, which may lead to observed inconsistencies between primary and backup data stores. FIG. 3A illustrates violation of write order enforced by direct/indirect causality when using a primary data store 302 and a backup data store 304, according to some embodiments. FIG. 3B illustrates violation of write order implied by concurrent reads when using a primary data store 302 and a backup data store 304, according to some embodiments. Both of these above created a specific order between writes to OS1 and OS2. The first (FIG. 3A) is a causal dependency explicitly enforced through program logic, whereas the second (FIG. 3B) is implicit through the visibility of the updates. In both of these scenarios, the backup system should preserve a happens-before relation (e.g., in order of time of occurrence) between the writes that was established at the primary site (e.g., providing a linearizable (externally consistent) backup system).

In embodiments, by preserving the same order of occurrence of writes/updates at a backup site as the writes/updates occurred at the primary site (e.g., append and/or commit at the backup site in the same order as they were appended and/or committed at the primary site), the backup site may take over as the primary site in an externally consistent (linearizable) manner when disaster recovery is implemented. In other words, the order of the writes/updates stored at the backup site is the same/consistent with the order of the writes/updates that were stored at the primary site, from the perspective of a client application of the distributed data store that originally performed the writes/updates to the primary site (e.g., in a particular order according to the client application's logic). In embodiments, this may be accomplished using timestamps, as discussed below.

Note that in FIG. 3A, causally related non-overlapping writes to distinct shards may be backed up in the reverse order at the backup site (compared to how the writes are stored/applied at the primary site), leading to backup inconsistency if the primary fails between backups of the two writes. Also, in FIG. 3B, order implied by visibility of concurrent non-overlapping writes should be preserved in the backup. However, traditional techniques do not guarantee the correct backup order in this case either.

Timestamps

In some embodiments, all writes, data as well as metadata, in the data store are applied through write-ahead logs. In various embodiments, the data store will contain a unique log per shard. Thus, in this model, the writes discussed above are first appended to the leader log and then to the follower logs. These appended writes may be shipped to the backup asynchronously.

In embodiments, at the backup, out-of-order reception of log records for different shards is acceptable. It is the order in which the log records are applied to the backup shard that is important to preserve correct happens-before relation between data store writes. For instance, in the examples shown in FIG. 3, even if the backup receives the write to OS2 before it receives the write to OS1, it may need to guarantee that if OS2's write is applied to the backup data store, OS1's write should also be available for application at the backup data store. This requirement or rule permits a relaxation in that OS2's write can be applied to the backup data store before OS1's write is applied to the backup data store. In embodiments, it may be assumed that no application directly reads from the backup data store, so ordering application of OS2 before OS1 is permitted.

In some embodiments, a log record's write can be applied to the backup data store only after all log records' writes it causally depends on have at least been received at the backup in a reliable (replicated, if necessary) way. This causal dependency may not always be determined by just observing the log records from the different logs, particularly in the problematic cases described earlier. However, the happens-before links between log records can be indirectly embodied by monotonically increasing timestamps.

In embodiments, timestamps tagged on log records can help establish a happens-before relation between log records generated in different logs. If two writes are causally dependent, they will be tagged with different timestamps correctly embodying the order of the writes. This is a conservative approach since it creates unnecessary happens-before relations between writes that are not causally related—absent additional dependency information, any writes that happened at time T are assumed to be causally dependent on all writes that happened at all shards at time T−K, for any integer K>0. However, in some embodiments it seems to be the only viable approach (or desirable approach) given that ordering relations established through application logic, or through visibility of updates, are opaque to the data store (e.g., inspecting just the log records on different logs does not reveal such ordering relations). Furthermore, there may be interesting optimizations, such as pipelining, batching, and some key design decisions made in SysDR that eliminate or almost entirely eliminate performance overheads due to this superfluous order enforced between unrelated log records. Discussed below is an embodiment that enables globally synchronized timestamps in an asynchronous distributed infrastructure.

Distributed Clocks

Globally synchronized distributed clocks has been challenging to implement using traditional techniques. The Network Time Protocol (NTP) is a standardized distributed clock protocol that has been used in the industry for several decades. NTP may achieve accuracy (maximum deviation from the "global" time, also called clock drift) within 10s of microseconds (or less) to 10s of milliseconds based on the network topology and data center size. Events occurring at a coarser granularity may be tagged with NTP timestamps to establish a happens-before relation in terms of global time.

Traditional scalable distributed systems such as the "Spanner" database use a combination of atomic clock appliances and GPS devices to determine the clock drift (accuracy), perceived by the clock appliances and GPS's. This clock drift is embodied by a time interval abstraction called TrueTime. Spanner's transaction commit protocol is managed to ensure that a transaction's beginning and end do not fall in even partially overlapping TrueTime (time ranges). This "guarantee" is used to establish a linearizable order of Spanner transactions. Spanner's TrueTime range was reported to be in the order of single digit milliseconds. This clock accuracy however spans the multi-data center, geo-replicated system. Embodiments herein may implement clock synchronization within a data center where the data store is hosted. Therefore, the backup site's clock does not need to be synchronized with the primary site's clock.

Orthogonal to the Spanner work, the Precision Time Protocol (PTP), which was standardized about a decade earlier, uses dedicated hardware resources on network routers, switches, and end points to achieve much higher accuracy, in the order of submicrosecond ranges within a data center. More recent work has proposed schemes that achieve greater accuracy (e.g., close to single or double digit nanoseconds).

Globally Synchronized Clocks

In embodiments, it may be assumed that the data center used to host the SysDR-augmented distributed data store has the capability to support global time with PTP or other more recent clock synchronization infrastructure. This delivers in the order of submicrosecond scale clock drifts.

In some embodiments, it may also be assumed that replication of log appends is comparatively a much coarser operation (e.g., taking much longer than the clock drift), taking tens to hundreds of microseconds, or even milliseconds (in order to allow linearizable backup of data stores.) In other words, the replication of log appends may take longer (e.g., at least an order of magnitude longer in embodiments) than the clock drift. Therefore, in embodiments, the maximum clock drift for a global clock is less than a completion time to write a given update to a primary shard and at least a threshold number of replicas of the primary shard as part of a given commit. Thus, causally dependent updates of OS1 and OS2, as depicted in FIG. 3(a), will be separated by timestamps that are consistent with the order of the updates (due to the fact that the maximum clock drift for the global clock is less than a completion time to write a given update to a primary shard and at least a threshold number of replicas of the primary shard as part of a given commit).

In embodiments, if a log record is timestamped at the beginning of its append operation, the ordering indirectly created by concurrent reads, as depicted in FIG. 3(b), is correctly embodied by the timestamps. This is because the append operation itself is expected to take an interval that is much greater than the global clock's drift due to the much coarser replication latency. As a result, the read of OS1 will happen at a time strictly greater than the write's timestamp by at least the clock accuracy window. Furthermore, the read of OS2 happens after the read of OS1. Even if the two reads happen quickly, within the clock accuracy window, if the read of OS2 returns its old value, it may be "guaranteed" that the write of OS2 will have a timestamp that is greater than the timestamp of OS1's write. In such embodiments, it may be assumed that the data store's implementation guarantees that if the write of OS2 had a timestamp less than the time at which its read happened, the read would be ordered after the write in shard S2, and thus return its new value.

SysDR Architecture

In some embodiments, globally synchronized timestamps are foundational to SysDR's functioning. However, there are several other key components of SysDR that should be architected carefully to deliver efficient and scalable DR. In particular, SysDR should ensure that the backing up process does not affect performance of the primary data store, SysDR should be able to absorb and apply a large number of logs from the primary to the backup site correctly and in a scalable way, SysDR should tolerate local faults in the primary site as well as the backup site, SysDR should bootstrap a new backup data store from an existing data store, SysDR should handle failover when a disaster occurs at the primary site, and integration of SysDR in an existing distributed store should not entail significant changes to the data store's architecture and implementation.

Figure 4:
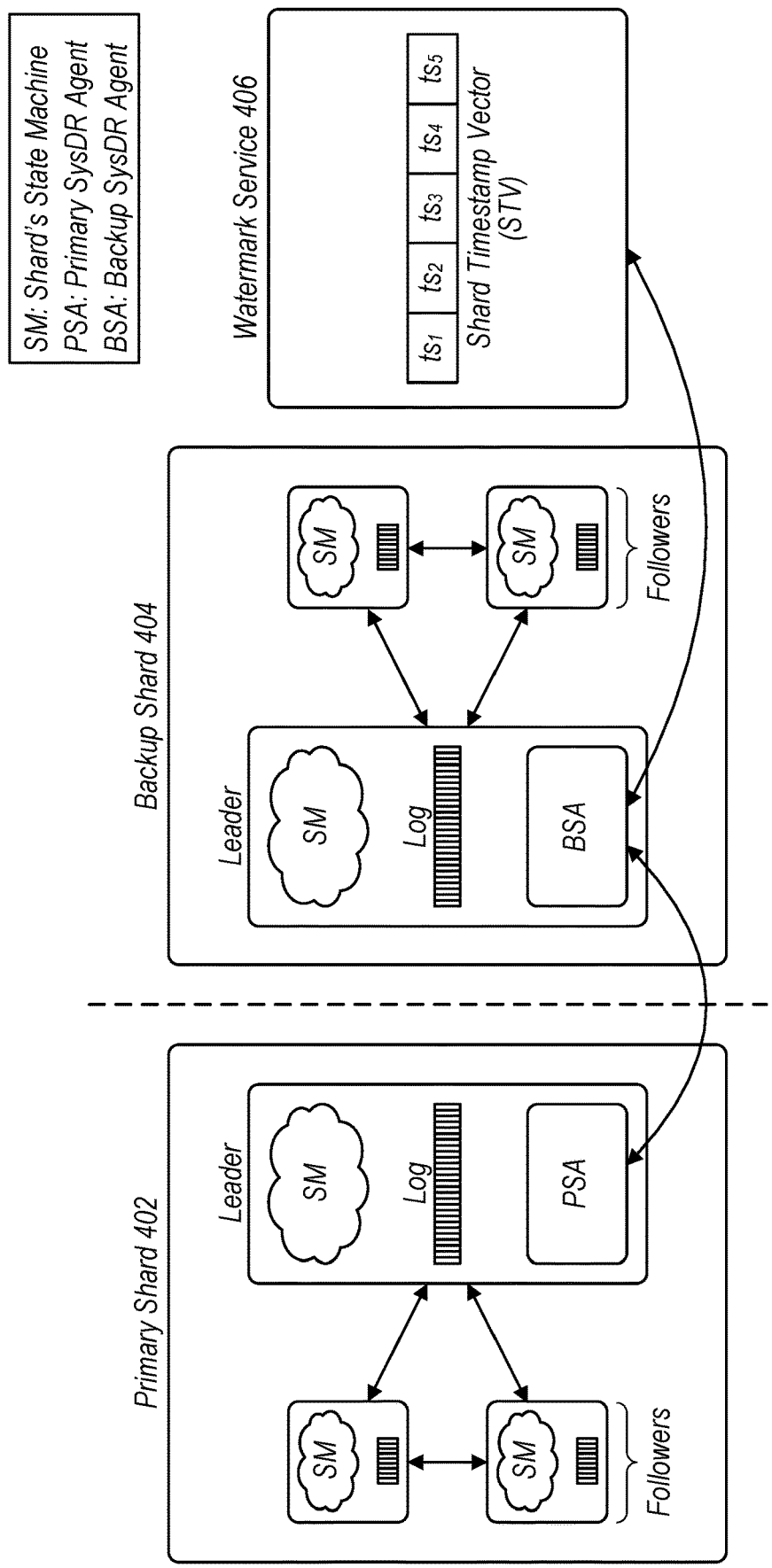
FIG. 4 is a block diagram illustrating a high level architecture of SysDR, according to some embodiments.

FIG. 4 is a block diagram illustrating a high level architecture of SysDR, according to some embodiments. The depicted embodiment contains three principal components: (i) the Primary SysDR Agent (PSA) of the primary shard 402, (ii) the Backup SysDR Agent (BSA) of the backup shard 404, and (iii) the Watermark Service 406. In the example embodiment, "SM" stands for the shard's state machine.

The depicted embodiment also may require a few minor modifications to the data store's write-ahead log. A PSA is embedded in each replica of every shard in the data store on the primary site. PSA of a shard's leader node asynchronously sends new committed log appends to the corresponding backup shard leader's BSA (each backup replica has a BSA). For scalability on the backup site, each shard's log grows independently of other shards' logs. As a result, an out-of-band mechanism may be needed to construct the most recent consistent state of the backup data store. The mechanism will ensure that the backup site constructs a version of the data store that is consistent with the current (or a prior) version of the primary data store. SysDR uses the watermark service to that end. Details on the data store's write-ahead log, PSA, BSA, the watermark service, and all their interactions are discussed below.

Write-Ahead Log

In some embodiments, SysDR's functionality relies on the existence of a write-ahead log in the data store it augments with DR. It may be assumed commonly found attributes are in this log: appends happen at the tail end of the log, marked by a tail index. Advancement of tail indicates that a log append has happened. The log is circular. The head end is marked by a head index. It is advanced (also called "log trimming") after a collection of log records at the head end are applied to the shard's state machine. The log also contains a commit index marking the index up to which log records have been replicated to a threshold number of replicas on the primary site (e.g., a majority of the replicas in a consensus based replication scheme). In addition, the log contains an applied index marking the log index up to which log records have been applied to the shard's state machine.

Figure 5:
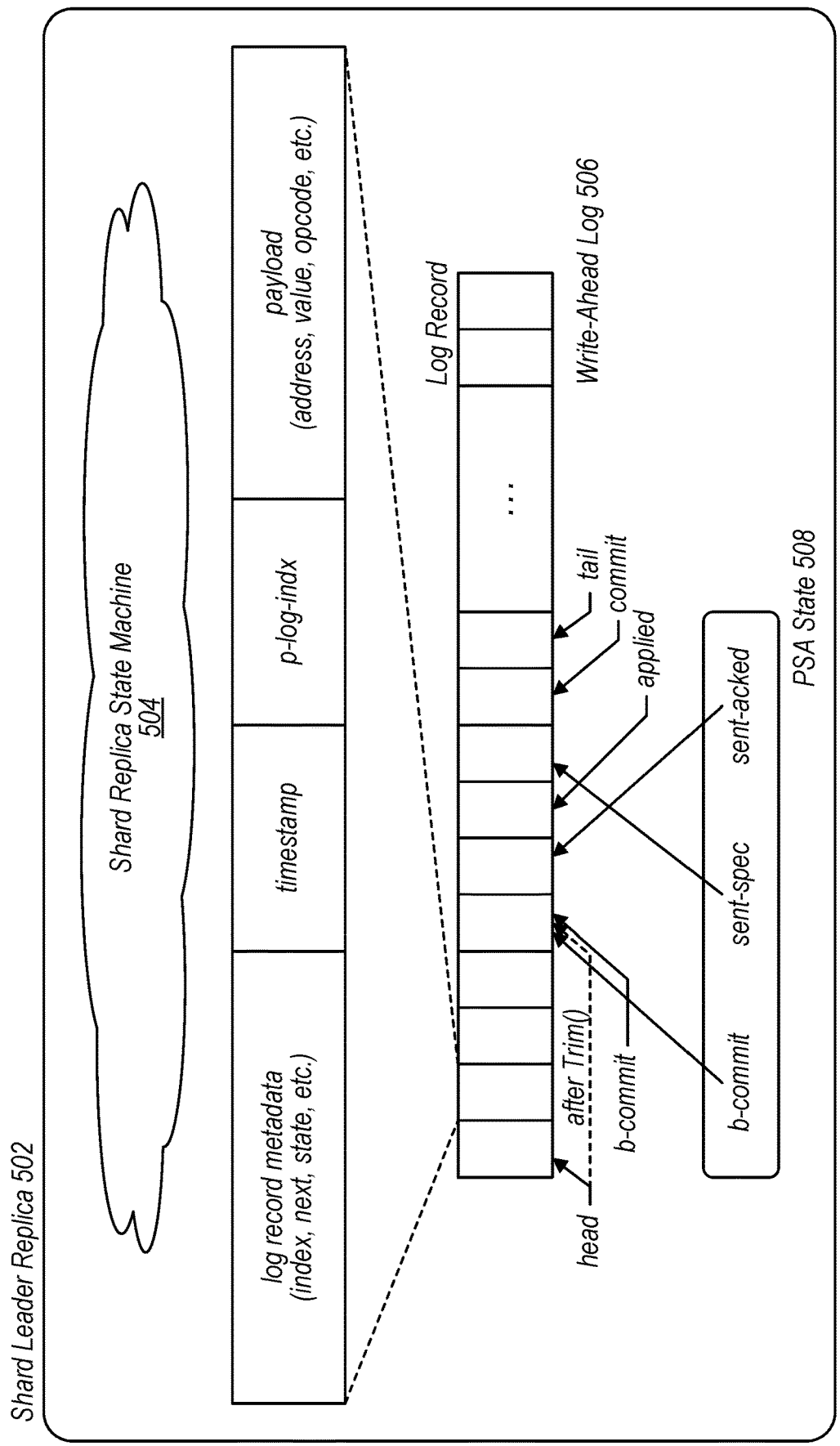
FIG. 5 is a block diagram illustrating a shard leader replica, including a shard replica state machine and a write-ahead log, according to some embodiments.

FIG. 5 is a block diagram illustrating a shard leader replica 502, including a shard replica state machine 504 and a write-ahead log 506, according to some embodiments. In the depicted embodiment, timestamp, p-log-indx, payload, and log record metadata are variables that belong to an individual log record in the write-ahead log. Also shown is the PSA state 508, which includes b-commit, sent-spec, and sent-acked. For SysDR, a new index is added to the log called b-commit, which represents the index up to which the backup shard has received and committed (replicated) the log. B-commit is not greater than commit, and is not less than head. The difference between b-commit and commit essentially represents the lag in the backup shard in comparison with the primary shard. There is no correlation between b-commit and applied other than both have to be between head and commit. However, they do have an effect on the log trimming task in that head can be advanced to the smallest of b-commit and applied. In FIG. 5, since b-commit lags behind applied, a log trim operation can advance head only up to b-commit (shown by the dashed arrow). Since its value can be reconstructed by consulting the backup shard, b-commit does not need to be a part of the persistent metadata of the log at the primary site.

In embodiments, the log may contain other auxiliary metadata in its header, which is of no concern to SysDR (assuming all data/metadata updates to the shard are appended to the log). It may be assumed each log record itself contains information pertinent to applying the update to each replica. The semantics of the log record's payload itself is data store specific and orthogonal to SysDR. Since the backup data store serves as a logical mirror of the primary data store, it is not expected that these semantics will change for the backup site. SysDR augments each log record with a timestamp field that contains the time returned by the globally synchronized clock on the primary site. Timestamp is written in the log record at the beginning of the log append, thus marking when the append was initiated.

In some embodiments, SysDR needs each log record's index in the primary replica's log. This p-log-indx index is used by the backup shard to pass on to the primary shard the log index of the latest log record that the backup shard has appended to its log. Since the backup data store is not necessarily a physical mirror of the primary data store (e.g. replication factors may be different on both sites), the configuration updates at the backup shard may be different from the configuration updates in the primary shard. As a result, the p-log-indx of a log record may be different from its index in the corresponding backup shard's log. For instance, a log record appended at the primary shard's log may have an index of 10, which would become that log record's p-log-indx. However the corresponding backup shard's log may append that same log record at index 8. The backup shard can use that log record's p-log-indx (10) to inform the primary shard that it has received log records up to index 10. The primary shard then knows that it needs to back up log records from index 11.

Primary SysDR Agent (PSA)

In embodiments, a PSA is hosted in each replica of each primary shard. It is an independent thread of execution that continuously monitors the shard's log and forwards any newly committed (successfully replicated on the primary shard's replicas) log records to the backup site. At any given time, only the primary shard's leader's PSA (henceforth, just PSA for brevity) is actively engaged in replication to the backup site.

In some embodiments, PSA sends log records to the backup site in the order they were appended at the primary shard's log. It may need to track the latest log record that was successfully received (but not necessarily committed) at the backup site. It does so with the sent-acked index of the PSA state 508—after replicating a log record, the backup shard sends back an acknowledgment (ack) back to the primary leader's PSA, which the latter uses to update sent-acked.

In embodiments, another field is added to PSA's metadata, the sent-spec index, which indicates the log index up to which log records have been sent to the backup site. This index enables PSA to send additional (committed) log records while acks for previously sent log records are pending. It is advanced by PSA immediately after new log records are sent to the backup site. The number of pending acks can be capped by a configurable threshold after which PSA blocks, waiting for those acks. Log records are resent if their acks are not received in a preconfigured timeout interval. Sent-spec trails the log's commit, and is in turn trailed by sent-acked. Sent-spec and sent-acked become equal when PSA receives acks for all sent log records. FIG. 5 depicts PSA's sent-acked and sent-spec pointing to different log records.

In some embodiments, sent-acked is never behind the log's b-commit. PSA also hosts a local (cached) copy of the log's b-commit for expedited lookup of its value. Note that PSA's state variables do not need to persist; they can be reconstructed from the primary and backup shards' states.

Backup SysDR Agent (BSA)

In some embodiments, BSA is hosted in each replica of each backup shard. Like the PSA, the BSA is an independent thread of execution that performs a sequence of operations that interact with the corresponding PSA, the backup shard's log, and the watermark service. Only the backup shard's leader's BSA (henceforth, just BSA for brevity) performs all these operations.

Figure 6:
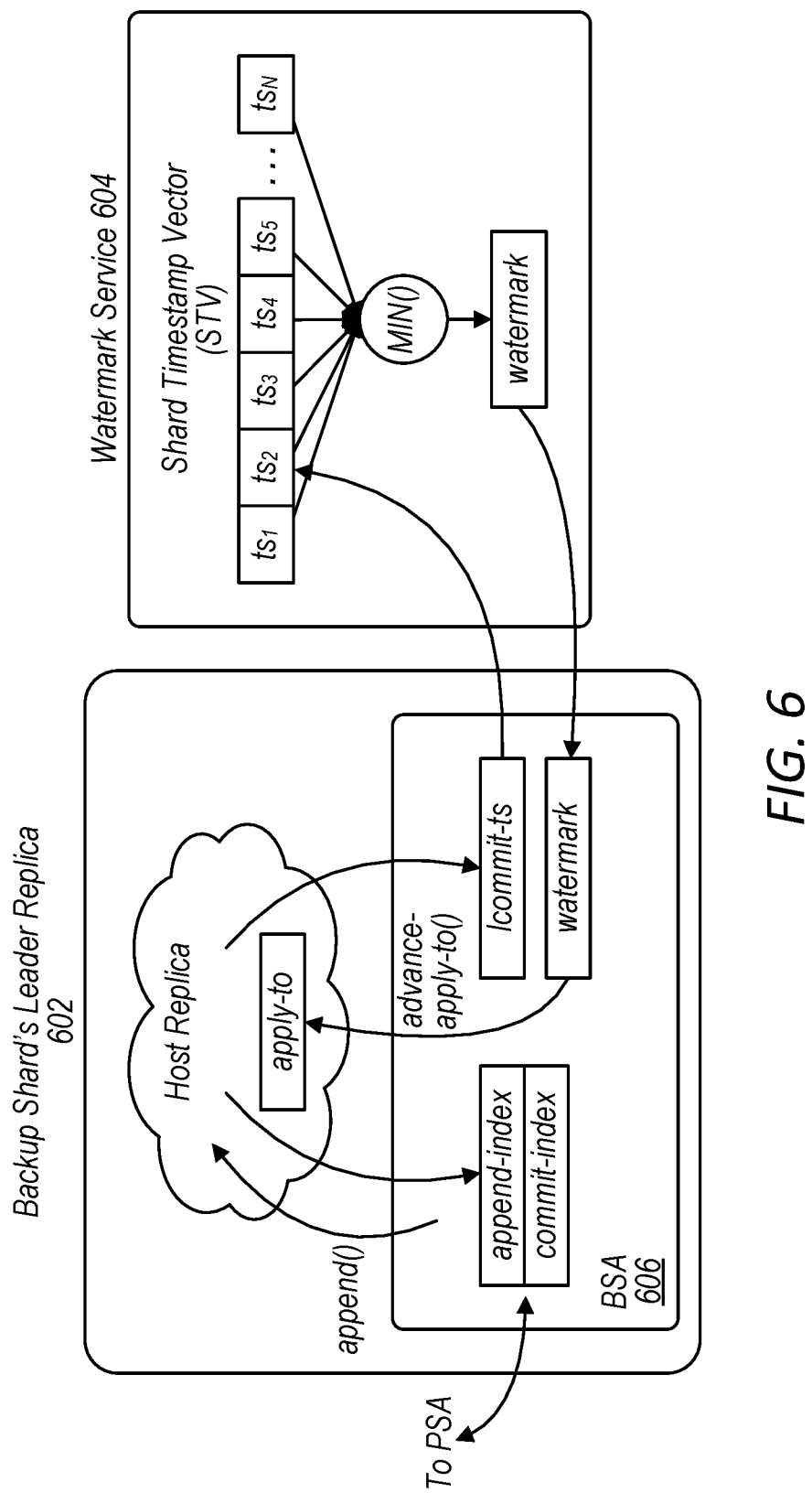
FIG. 6 is a block diagram illustrating a backup shard's leader replica and a watermark service, according to some embodiments.

FIG. 6 is a block diagram illustrating a backup shard's leader replica 602 and a watermark service 604, according to some embodiments. As shown, the backup shard's leader replica 602 includes a BSA 606. The BSA's responsibilities include receiving log records sent by the PSA. The log records are received in the order they were appended at the primary shard's log; log records received out-of-order are nacked. The BSA sends the received log records to its host replica—the append( ) call in FIG. 6. It also stores p-log-indx for the last received log record in the local variable append-indx. While the host replica (leader of the backup shard) replicates these log appends, the BSA sends an ack for those log records back to the PSA. Both the ack/nack messages contain the value of append-indx, which confirms the BSA's progress with the PSA. At PSA, the received append-indx value overwrites its sent-acked.

In embodiments, only the committed log records are sent by PSA to BSA. The backup shard's log records may be considered committed only after they are successfully replicated to its replica set (based on the replication criterion, e.g. majority, as dictated by the data store's implementation). The backup shard's log maintains its own commit that is independent of the primary shard's log's commit. The backup shard's commit is advanced as log records are successfully replicated to the shard's replicas. The BSA monitors this commit and copies the last committed log record's p-log-indx into a local variable called commit-indx. The BSA adds the updated commit-indx in the aforementioned ack/nack it sends back to the PSA, which uses the value to advance its b-commit.

In some embodiments, committed log records of the backup shard cannot be immediately applied to the shard's state machine since simply applying those log records can lead to inconsistencies in the backup site if the primary happens to fail at an arbitrary time. A committed log record r becomes eligible for application only after all shards on the backup site have committed all the log records with timestamps less than r's timestamp. To accomplish that efficiently, the BSA periodically performs two actions: (i) it queries the backup shard's log to determine timestamp of the latest committed log record, and stores it in a local variable called lcommit-ts; and (ii) it thereafter sends the lcommit-ts to the watermark service, which maintains a repository of largest timestamps of committed log records observed at each shard.

Watermark Service

In embodiments, a watermark service is responsible to determine what log records can be applied safely to the backup data store. As mentioned earlier, the watermark service may make that determination for a log record r once it observes that all backup shards have committed log records with a smaller timestamp than r. To that end, it monitors timestamps of the latest committed log records at each backup shard. Each BSA periodically sends its lcommit-ts to the watermark service.

In some embodiments, the watermark service maintains a vector of timestamps, each of which represents the largest timestamp received from each backup shard's BSA. The minimum of these timestamps, referred to as the backup's watermark, indicates the time up to which all backup shards have committed log records. It is safe to apply log records with timestamps less than or equal to the backup's watermark.

In some embodiments, after the watermark service receives lcommit-ts from a BSA, it writes the received lcommit-ts to that backup shard's slot in its shared timestamp vector (STV). It then computes a new minimum watermark and sends it back to the backup shard's BSA. FIG. 6 depicts the STV for N shards, and shows receipt of an lcommit-ts in the STV slot labeled ts2. The figure also shows computation of the new watermark using the MIN( ) function. The watermark service responds to the BSA with the newly computed watermark.

In embodiments, the new watermark received at the BSA is used to update its watermark, and is then forwarded, via the advance-apply-to( ) call shown in FIG. 6, to the shard to advance its log's apply-to index. The backup shard updates its apply-to index based on the received watermark. In the end, the shard's apply-to index points to the latest committed log record that can be applied to the shard's state machine. Note that the apply-to index does not need to be a part of the persistent metadata of the backup shard, and remains a simple counter in the non-persistent DRAM-resident metadata of the backup shard's log. Each shard periodically exchanges timestamp messages with the watermark service to stay up-to-date with the backup data store's progress.

In some embodiments, throughout its execution, the watermark service maintains the invariant that its watermark is monotonically increasing. Note that the watermark service itself is an optimization to the more straightforward solution where each BSA periodically broadcasts its lcommit-ts values to all other BSAs on the backup data store. However, for large numbers of backup shards, the amount of time required for each backup shard to broadcast its lcommit-ts value to all other backup shards becomes extremely long and prone to message errors. By using a watermark service, the backup data store can be scaled to have a very large number of backup shards, without the large overhead/time that would otherwise be required to for each backup shard to broadcast its lcommit-ts value to all other backup shards. Therefore, the watermark service reduces the amount of time and resources needed to keep each backup shard up to date (e.g., using the global watermark timestamp and/or MIN( ) function) (improving the efficiency and reducing associated errors). In the end, the watermark's ground truth, the lcommit-ts values in log records of each shard's log, remains persistently stored in shard logs. Thus even if the watermark service fails, it can be easily reinitialized from all the backup shard logs' lcommit-ts values.

Replication Initialization

In embodiments, when a replica in a backup shard is created, it first performs all the initialization work relevant to the data store's implementation. It then launches its BSA. The launched BSA remains idle until its host replica becomes the shard's leader. When the BSA detects that its host replica has become the leader, it performs the following steps: first, it determines the shard's lcommit-ts by reading the last committed log record's timestamp. Second, it establishes a connection with the watermark service to determine the backup site's global watermark. Third, if it detects a change in the global watermark, it advances the shard's apply-to index to inform the shard that more log records may be applied to the shard's state machine. Finally, the BSA listens for a request from the PSA in the corresponding primary shard. In various embodiments, these steps may be performed in any other order and/or one or more steps may be skipped.

In some embodiments, similar to BSAs on the backup site, at the primary site, each PSA is launched in its host replica and remains idle until it detects that the host replica has become the leader of the primary shard. A new leader's PSA builds its state by querying the BSA from the corresponding backup shard. The BSA responds with its append-indx and commit-indx values to the newly identified PSA. If the contacted BSA is not the backup leader, it responds with a NOT LEADER message. The PSA then queries all the replicas of the backup shard's replica set to determine the correct leader. The correct leader's BSA responds with its append-indx and commit-indx values. The commit-indx value serves as the initial value of the primary shard's b-commit, whereas the append-indx is used to initialize the PSA's sent-spec and sent-acked indexes. Thereafter, the PSA can asynchronously start replicating its shard's newly committed log records to the backup site.

Backup Process

Figure 7:
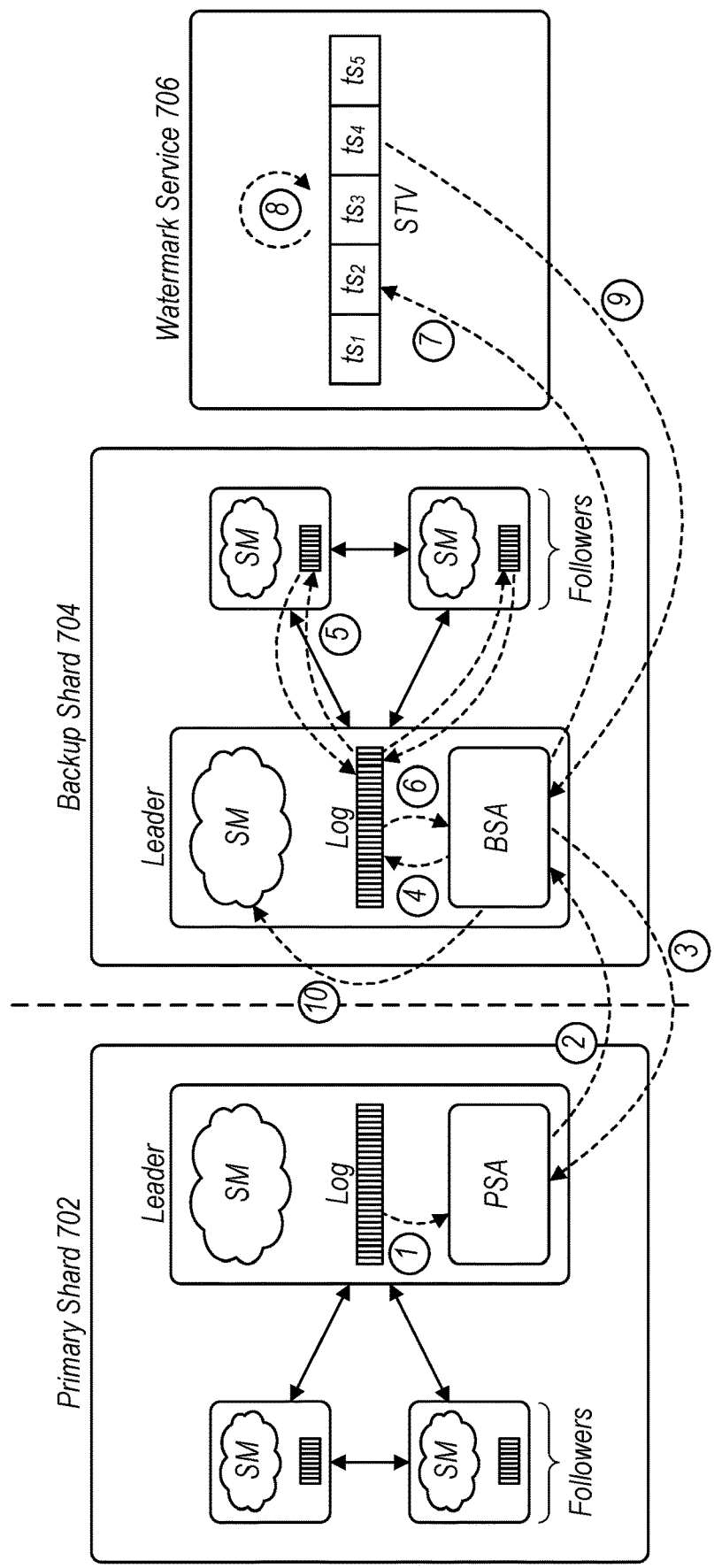
FIG. 7 illustrates a flow for the asynchronous replication/backup process of each update received at a primary shard's leader, according to some embodiments.

FIG. 7 illustrates a flow for the asynchronous replication/backup process of each update received at a primary shard's leader, according to some embodiments. The whole process takes 10 steps (labeled in the figure), some of which happen concurrently. As depicted, the primary shard 702 is located in a primary data center, the backup shard 704 is located in a backup data center.

Step 1: In some embodiments, the primary shard's leader achieves consensus on its recently received update request by replicating to a majority of its followers, and advances its log's commit. Note that the leader timestamps the log record with the globally synchronized clock's value as a part of the append. Its PSA periodically checks commit for changes and detects that a new log record is available for asynchronous backup.

Step 2: In some embodiments, The PSA forwards the recently committed log record, in the form of a BACKUP request, to its "peer" BSA (BSA on the backup shard's leader). After sending the log record, the PSA advances its sent-spec index.

Step 3: In embodiments, on receiving the PSA's log record, the BSA can send back one of three responses: (i) A NOT LEADER message if its host replica is not the leader of the backup shard. (ii) A nack indicating that the log record was received out-of-order. The nack contains the BSA's append-indx, which indicates the last log record it received in the correct order. The PSA can use the received append-indx to resend the log records that were not received in the correct order. (iii) An ack response indicating to the PSA that the log record will be appended at the backup shard. Once the PSA receives an ack, it advances the sent-acked index to the log record for which it just received the ack. In both the nack and ack responses, the BSA also embeds its append-indx and commit-indx values to help the PSA adjust its sent-spec, sent-acked and b-commit indexes.

Step 4: In some embodiments, the newly received log record at the BSA is then forwarded to the host replica to append to its log. Note that at this stage the BSA assumes that its host replica is still the shard's leader. If that is not the case, the BSA detects the change in the leader's state and goes back to a passive state where it no longer processes log records received from its peer PSA.

Step 5: In embodiments, the backup shard's leader attempts to achieve consensus on the newly appended log record, advancing its commit if it succeeds. The details of this step are data store specific.

Step 6: In some embodiments, the BSA periodically determines if new log records were committed at the backup shard. If so, it updates commit-indx, which is forwarded to the PSA in response to a subsequent log append message it sends (see step 3). The BSA also updates its lcommit-ts with the last committed log record's timestamp.

Step 7: In embodiments, if the lcommit-ts changed (increased), the BSA sends its new value to the watermark service 706.

Step 8: In some embodiments, on receiving a new lcommit-ts of a shard from its BSA, the watermark service updates the shard's slot in its STV with the lcommit-ts, and then computes the new global watermark.

Step 9: In embodiments, the watermark service responds to the BSA with the new global watermark.

Step 10: In some embodiments, on receiving the new watermark value from the watermark service, the BSA updates its local watermark and uses it to update the replica's apply-to index (to the latest log record with timestamp less than or equal to the watermark). The replica is then enabled to apply all its log records up to the updated apply-to index.

In embodiments, the above described algorithm leads to an interesting backup model: an ever-evolving prefix of the history of the data store's state. It does so by creating a consistent cut across all shard logs, delineated by the monotonically increasing global watermark's value. In a sense, each advance in the global watermark represents a consistent snapshot of the entire data store. However, the snapshot's lifetime exists only briefly until the global watermark advances to a higher value. This makes SysDR's approach quite distinct from traditional techniques for snapshot-based backups that identify (and embody) the consistent state of the data store at a specific point in time. In a traditional snapshot approach, a user can refer to the specific snapshot generated in the past even though the primary data store may have changed substantially since the snapshot was taken. SysDR creates a continuously evolving backup, where retrieving the state of the data store at a distinct point in the past may not be possible, in embodiments. Nonetheless, SysDR achieves DR with several improvements over traditional techniques as described herein.

Keeping Up with the Primary

As stated earlier, in some embodiments, in SysDR's replication algorithm, all backup shards indefinitely receive (and replicate) log records independently of each other. However, backup shard logs are finite in size and hence should be applied to shard state machines to make space available for future log records (similar to how the primary site shards use and recycle their logs). As discussed herein, to avoid inconsistencies in the backup site, shards coordinate with the watermark service in order to apply their log records to their state machines.

In some embodiments, as long as the watermark service keeps receiving monotonically increasing lcommit-ts values from all shards in the backup site, SysDR's replication algorithm ensures that the global watermark remains monotonically increasing, thus guaranteeing liveness. In some embodiments, liveness may require a foundational assumption—each primary shard keeps sending log records with monotonically increasing timestamps at regular intervals. To that end, each primary shard may generate log records at regular intervals, even when the shard does not receive any update requests from the data store's client applications. This can be achieved by making the primary shard's leader append NOP log records at regular intervals in their logs. This capability is available in most, if not all, production quality distributed data stores. Thus, even if a shard does not receive update requests for prolonged intervals, it will keep producing timestamped NOP log records that help continuously increase the global watermark, thus guaranteeing liveness.

In embodiments, for SysDR to work, the backup process should be able to keep up with the primary site's update rate. This implies that the log at each primary shard has enough capacity to receive new log records while older log records get replicated and applied to the backup site.

In some embodiments, another important aspect of SysDR that helps the backup site keep up with the primary is its ability to do batching at various stages in the entire backup lifecycle: first, PSA can send a collection of contiguous log records to its peer BSA batched in a single request. Second, the log records forwarded by BSA to its host replica can also leverage any batching capabilities supported by the data store itself. Third, determination of the lcommit-ts by BSA is amenable to covering a large batch of recently committed log records in one shot— BSA needs to simply determine the timestamp of the last committed log record. Lastly, traffic to the watermark service can also be modulated by controlling how often BSA sends its lcommit-ts to the watermark service.

Fault Tolerance

In embodiments, it may be assumed that the original data store is fault tolerant (to non-byzantine fail-stop failures). This capability of the data store can be leveraged in several ways to achieve fault tolerance in SysDR. Points of failure include the PSA, BSA, and watermark service.

As stated earlier, in some embodiments, the PSA is hosted in a shard's replica. Under the assumed fail-stop failure model, failure of the PSA implies failure of its enclosing replica. The data store's infrastructure may handle such replica failures, by completely shutting down the failed replica and spinning up a new replica for the same shard. In general, as long as the majority of replicas are active in a shard, they will have a leader, whose PSA will continue backing up log records to the corresponding BSA at the backup shard. If it is a follower replica that fails, nothing needs to be done for the PSA since it is passive. If the leader replica fails, the data store initiates its leader election protocol for the shard, a new leader gets elected, after which the leader's PSA becomes active.

In embodiments, when a new PSA begins execution it will first initialize its variables (b-commit, sent-spec, and sent-acked). It does so by sending the host replica's earliest committed log record that has not been recycled. BSA's response to the message, whether an ack or a nack, contains its current append-indx and commit-indx values that initialize PSA's sent-acked and b-commit; sent-acked is copied into sent-spec to initialize the latter. Even if the primary shard contains multiple active PSAs at the same time, SysDR works correctly since the PSAs replicate only committed log records and the BSAs can ignore redundantly received log records.

In some embodiments, BSA's failure is similarly tied to the failure of its host replica. Initialization of BSA's variables is done by consulting its host replica's log. In addition, the BSA will communicate with the watermark service to take over the responsibility of forwarding lcommit_ts values for the shard. It also initializes its watermark variable by querying the watermark service.

In embodiments, the backup algorithm for a shard may experience some delays if the leader of the primary or backup shard fails. However, this delay may be largely related to the leader election process that is triggered after a leader fails. In most leader failure scenarios, this delay may be insufficient to stall the backup process to the extent that the backup shard cannot keep up with the primary shard.

As stated earlier, in some embodiments, the watermark service is itself an optimization. If it fails, a new instance for the service is spun up and its STV is initialized by communicating with all the backup shards. To reduce the impact of a failing watermark service, SysDR can spin up multiple concurrent instances of the watermark service. These instances independently advance their view of the global watermark by communicating with backup shards; they do not need to synchronize with each other. Thus, failure of a single watermark service instance does not lead to any delays in the backup process.

In some embodiments, in principle, there exists a pathological scenario where one or more primary shards fail or cannot communicate with their backup counterparts. In such circumstances, the backup site's global watermark would stall, and some backup shards would invariably become stale. However, the backup data store as a whole would still remain consistent, albeit stale. In the worst case, in some embodiments a multitude of backup shards may need to be bootstrapped anew after the source of the primary-backup shard communication problem is fixed through manual intervention. The probability of such pathological scenarios is small (given the fault tolerance capabilities of SysDR and the data store that uses it).

Shard Mappings

In embodiments, another interesting aspect of SysDR is the primary-backup shard mappings. This mapping is used to discover replicas of the same shard on both the primary and backup sites. The mapping framework itself heavily depends on the original data store's implementation. For instance, if the replicas of a shard are statically defined for a data store, say using a globally visible configuration file, the primary-backup shard cluster mappings could be added in those configuration files. If the data store can dynamically shutdown shard replicas and spin up new ones at different IP addresses (relocation), a dynamic mapping may need to be maintained between the primary and backup shard replicas.

In some embodiments, it may be assumed that shards are identified by a unique global identifier, called shardid. It may also be assumed that the primary data store maintains its internal shardid-replica mappings in a highly available metadata service. The backup data store will also maintain such mappings for its shards and replicas. The primary and backup shard-replica mappings may be quite different (e.g. different replication factors, different replica IP addresses). However, the primary backup shard "peers" will have identical shardids. A simple primary backup shard mapping table can be created at both the primary and backup sites. Any configuration changes in individual shards on both the primary and backup sites can be used to update the primary-backup shard mapping table on both sites. The mapping table can be hosted in the aforementioned metadata service to make it globally accessible on the primary as well as backup sites. Any shard replica can then query for its replica set and the peer replica set on the other (primary/backup) site. It may be assumed shard mapping changes are a rare event, and hence lead to negligible updates in the metadata service.

Bootstrapping Backup Shards

In embodiments, it may be assumed the distributed data store has capabilities to bootstrap a new replica from an existing replica set of a shard. As described in the previous subsection, additional updates may be required for the primary-backup shard mapping table. SysDR leverages these same capabilities to spin up the backup shard (and its replicas) on the backup site Handling Disasters In some embodiments, while highly available data stores can tolerate failures of a significant number of resources, it may not be possible to do so beyond a particular threshold (e.g. partial or full power outage of a data center that makes some shards unavailable). Such a scenario may be called a disaster, and leave it up to the data store administrator to make that determination. Thus a disaster is designated, and recovery from it is triggered manually by the administrator. Designating a disaster at the primary site eventually leads to its shutdown. This can be done by flagging a disaster at any alive metadata service servers. Each primary replica periodically pings the metadata service to determine its health. If it is still available, the metadata service responds with a DISASTER flag that signals the primary replica that it needs to shut down. If the metadata service is unavailable the ping times out. In both cases, the primary replica assumes a disaster and shut down. Thus eventually all replicas in the primary site will shut down.

In embodiments, triggering recovery at the backup site leads to a number of steps that helps the backup bring up a new primary site. First, the backup site's metadata service is flagged for a RECOVERY mode. Each backup replica periodically pings the backup metadata service to determine its health. If the metadata service responds with a RECOVERY flag, the replica knows that recovery from a disaster is in progress. If the replica happens to be the leader of a shard, it will compute its final lcommit-ts value, and send it to the watermark service. The leader also marks its message as the final message.

In some embodiments, the watermark service thus receives final messages from all backup shards, and broadcasts the final global watermark to all the backup shard leaders' BSAs. The leader replica then goes in a special mode where it applies all its log records to the shard's state machine, and sends a recovery completion flag to the watermark service. Once the watermark service receives a recovery completion flag from all shards, the backup is designated to have recovered. It can thereafter act as the new primary site for the data store and be used to bootstrap a new backup site.

In embodiments, bootstrapping a new backup from a live primary site, that concurrently serves client requests, can be arbitrarily complex. A simpler approach to bootstrap the new backup from the new primary site may be taken before the latter goes live to serve new client requests. Bootstrapping happens concurrently for all shards. Once the backup bootstrapping process completes, the new primary is ready to go live.

Implementation

To evaluate SysDR's effectiveness, an experimental embodiment of SysDR was integrated it with Log-Cabin (a linearizable key-value (K-V) store that uses the Raft consensus protocol for synchronous replication). LogCabin is a single shard K-V store. To build a prototype distributed K-V store, a key-space sharding layer was added that hosts each shard in a 3-way replicated LogCabin instance. The key-space sharding map, which is static in the evaluated implementation, was directly available to clients through a thin client-side stub. The replica set for each shard is also statically defined in a configuration file accessible to all replicas. This configuration file was augmented with details on the backup shard replica sets as well as the watermark servers. The static primary-backup configuration setting helped to simplify the prototyping effort for expedited experimentation with SysDR. It is assumed that the machine local clocks are synchronized with the globally synchronized clock.

SysDR was implemented in the C++ programming language, which was also used to implement LogCabin. SysDR was implemented as a module in LogCabin. In the example embodiment, SysDR's code implements all its components—PSA, BSA, and watermark service. LogCabin uses an operation log to replicate its leader's updates to the follower nodes. This log implementation was modified to incorporate all the fields and processing relevant to SysDR. These modifications amounted to 130 lines of code, which attests to the assertion of minimal disruption in a data store to integrate SysDR.

SysDR Overhead

In some embodiments, SysDR has been architected to do continuous backup of a distributed data store off the latter's client-facing critical path. As a result, SysDR is expected to impose no overheads on client requests. This expectation may be validated with an experiment that measures the performance of LogCabin with and without SysDR support. More specifically, the throughput and latency of the original LogCabin is compared with that of LogCabin with SysDR.

FIGS. 8A, 8B, 8C, and 8D illustrate the median throughput and latency, over a set of 10 test runs, of systems with and without SysDR support for workloads with different read-write ratios when varying number of clients, according to some embodiments. In the embodiments depict a SysDR overhead under Yahoo Cloud Serving Benchmark (YCSB) workloads with various read, write ratios (workload w is non-standard YCSB load). In FIGS. 8A-8D, the numbers shown next to points indicate the number of clients.

Figure 8B:
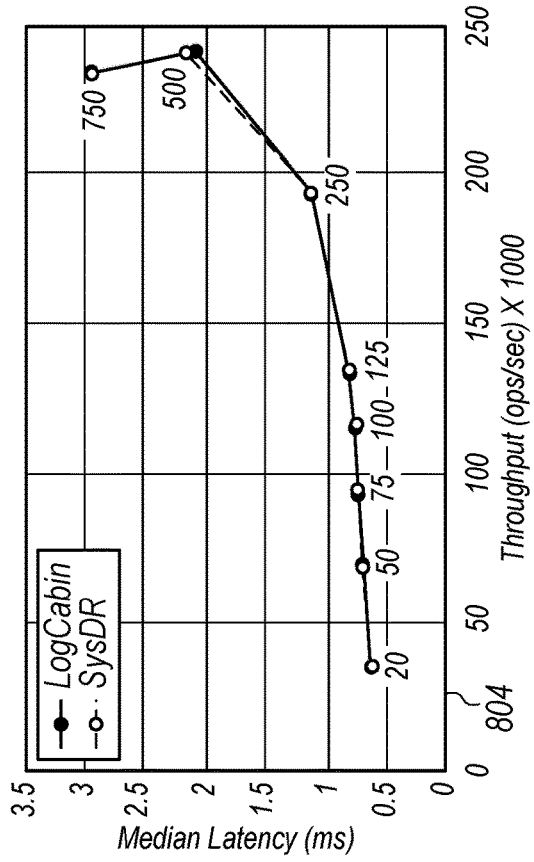
FIG. 8B illustrates the median throughput and latency over a set of 10 test runs, of systems with and without SysDR support for workloads with a read-write ratio of 50% read, 50% write when varying number of clients, according to some embodiments.
Figure 8D:
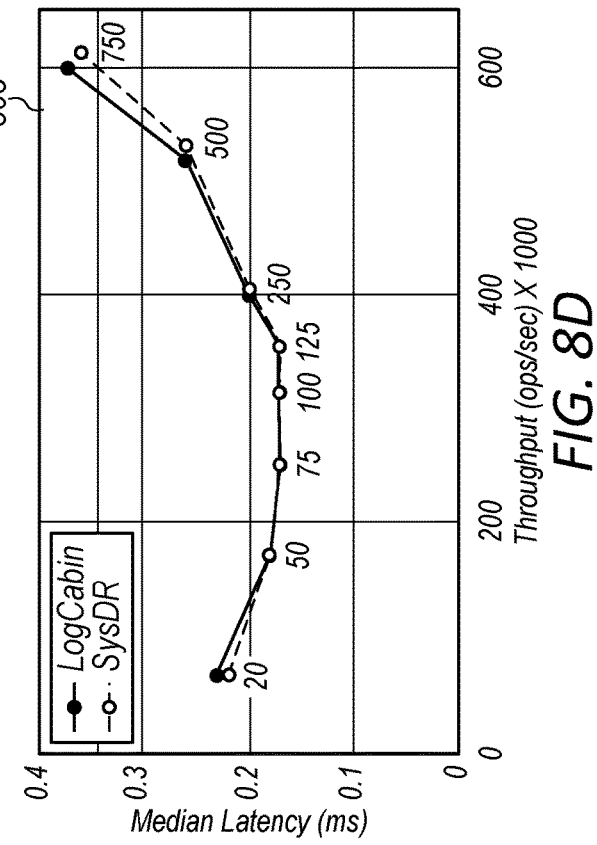
FIG. 8D illustrates the median throughput and latency over a set of 10 test runs, of systems with and without SysDR support for workloads with a read-write ratio of 100% read, 0% write when varying number of clients, according to some embodiments.
Figure 8A:
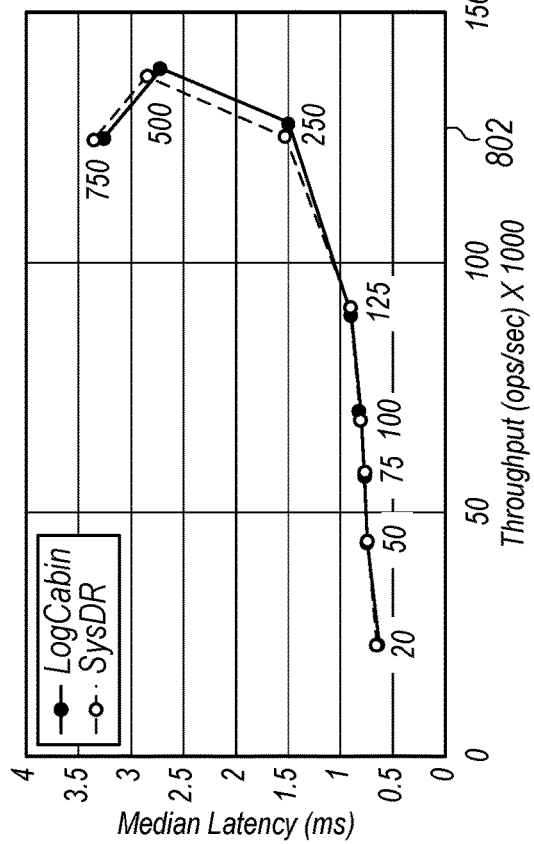
FIG. 8A illustrates the median throughput and latency over a set of 10 test runs, of systems with and without SysDR support for workloads with a read-write ratio of 0% read, 100% write when varying number of clients, according to some embodiments.
Figure 8C:
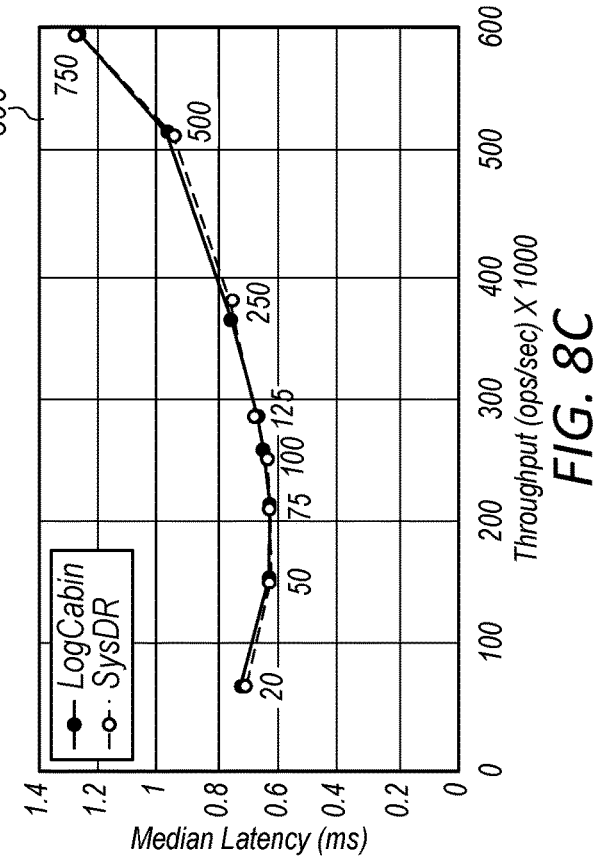
FIG. 8C illustrates the median throughput and latency over a set of 10 test runs, of systems with and without SysDR support for workloads with a read-write ratio of 95% read, 5% write when varying number of clients, according to some embodiments.

FIG. 8A illustrates the median throughput and latency 802 over a set of 10 test runs, of systems with and without SysDR support for workloads with a read-write ratio of 0% read, 100% write when varying number of clients, according to some embodiments. FIG. 8B illustrates the median throughput and latency 804 over a set of 10 test runs, of systems with and without SysDR support for workloads with a read-write ratio of 50% read, 50% write when varying number of clients, according to some embodiments. FIG. 8C illustrates the median throughput and latency 806 over a set of 10 test runs, of systems with and without SysDR support for workloads with a read-write ratio of 95% read, 5% write when varying number of clients, according to some embodiments. FIG. 8D illustrates the median throughput and latency 808 over a set of 10 test runs, of systems with and without SysDR support for workloads with a read-write ratio of 100% read, 0% write when varying number of clients, according to some embodiments. As shown, SysDR does not lead to overheads for any of the tested workloads (the minor differences may be attributed to random noise).

In example embodiments that were evaluated, originally up to 10% reduction in performance of SysDR was observed, but quickly it was discovered that an inefficiency in LogCabin led to the overhead. LogCabin is a multithreaded application that uses mutual exclusion locks to serialize access to its internal data structures. The worker threads of LogCabin process incoming requests and in the process may acquire pertinent locks that protect these data structures. Since LogCabin has a single write-ahead log, writers (workers) acquire a lock to append new log records. Incidentally, even the readers were implemented to execute the same code path that acquires that lock. Since SysDR's PSA behaves as a concurrent reader of the log, it ended up acquiring the log's lock every time it read newly appended log records (to ship them to the backup's BSA). This led to additional lock contention with writers, thereby resulting in performance overheads. After preliminary analysis of the code, it was determined that readers did not need to acquire the log's lock. Removing that lock acquisition eliminated performance differences between LogCabin and SysDR. Note that SysDR does not generate extra traffic in the local network as backup requests are sent to the backup site over the WAN.

Data Loss Window

In some embodiments, SysDR is a continuous backup system that has the promise of delivering a distributed data store backup that is fractionally behind the primary data store. The immediate consequence is a backup system with a tiny (millisecond scale) data loss window. To better understand this data loss window an experiment was conducted that measures a metric called the backup site's lag. Intuitively, the lag measures how far behind, in terms of time, is the backup site's state from the primary site's state. For example, if the current lag is 100 milliseconds, then it means that the backup site did not receive at least some log records that were committed at the primary site during the last 100 milliseconds. If the primary site shuts down at that point, the backup will lose updates that happened over the last 100 milliseconds—the data loss window.

In embodiments, the lag varies over time. Capturing the precise lag in a non-intrusive way over the duration of the distributed data store's lifetime is perhaps an infeasible undertaking. However, an approximation of the typical lag may be obtained by finding its bounds using some lightweight instrumentation. Discussed below are details of experiments to measure them, and the results of these experiments.

Lower Bound of the Lag

In some embodiments, the lower bound (lb) of the lag is the minimum (e.g., optimal) lag that can be achieved between the primary and the backup sites. It is the minimum time needed to send a log record from the primary site (e.g., PSA) to the backup site (e.g., BSA). In embodiments, lb cannot be lower than half the round-trip time (RTT) between the primary and backup sites. Moreover, if a log record is committed at time t at the primary site, then it is impossible for that log record to appear at the backup site before lb time units elapse. The lower bound is the time needed to perform step 2 of the backup process (FIG. 7). Thus, the lower bound depends significantly on the RTT between the primary and the backup sites.

Figure 9:
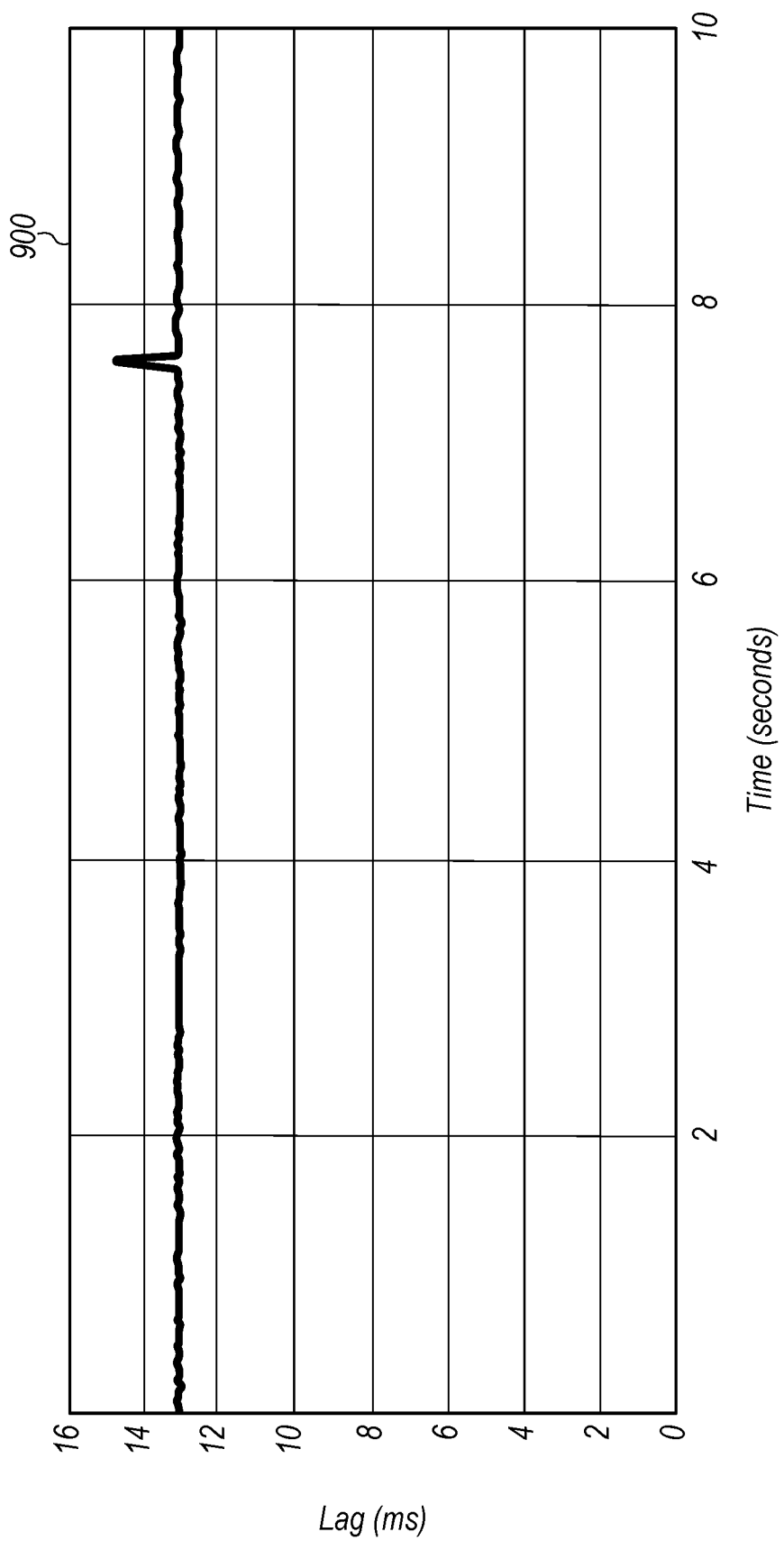
FIG. 9 illustrates the lower bound of the lag (output of one shard after running the experimental embodiment for 10 seconds), according to some embodiments.

In an experimental embodiment, the lower bound of the lag was measured on a cluster of 32 shards with a ping-pong experiment. In this experiment, the PSA of each shard sends a BACKUP request that has only one log record to the corresponding BSA. The BSA replies immediately with an acknowledgment when this request is received. When PSA receives the acknowledgement, it immediately starts sending another BACKUP request. The lag's lower bound from the BSA side was measured by taking the time difference between consecutively received BACKUP requests and divide it by 2 to get an estimate of the one-way latency (symmetric latencies between the PSA and BSA are assumed). FIG. 9 illustrates the lower bound of the lag (output 900 of one shard after running the experimental embodiment for 10 seconds), according to some embodiments. In the figure, the output of one shard is presented as it is representative of other shards' output. The average value of lag's lower bound is approximately 13.01 milliseconds and it is stable over time.

Upper Bound of the Lag

The upper bound (ub) of the lag is the difference between the commit time of a log record at the primary site and the time at which the output of the watermark service, called the watermark, becomes greater than or equal to the timestamp of the log record (FIG. 7—step 8). The upper bound of lag (FIG. 10) is discussed in detail below, after discussion of events that occur until a log record is backed up (FIG. 11).

Figure 11:
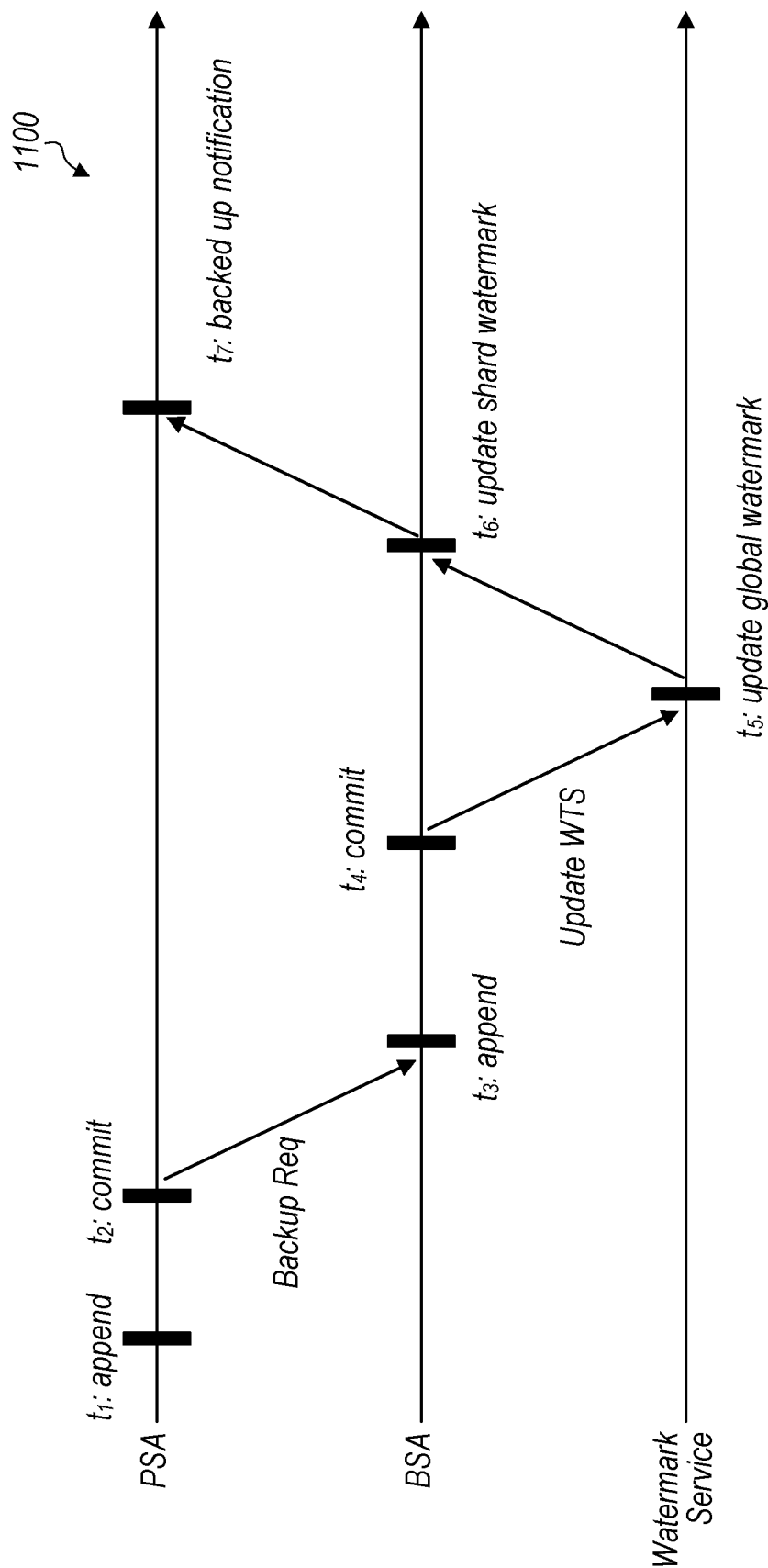
FIG. 11 illustrates events that occur until a log record is backed up, according to some embodiments.

FIG. 11 illustrates events 1100 that occur until a log record is backed up, according to some embodiments (e.g., sequence of events until PSA learns that a log record is backed up). Note that a log record that has committed on the backup site cannot be applied until the global watermark advances to the timestamp of that log record. So ideally, what is measured is t5–t2. However, computing this value is not trivial as timestamps t2 and t5 are captured by different entities—PSA and watermark service respectively, which are running on different machines in different data centers. To tackle this issue, the upper bound is measured using only PSA's clock by computing t7–t2 at the PSA, where t7 is the time when PSA receives the notification from BSA corresponding to the request sent at t2. However, this period includes the time needed to send the notification from BSA to PSA—lb (symmetric latencies are assumed)—that should not be included in the upper bound. As a result, the final value of the upper bound is computed as t7–t2–lb. Note that what is effectively computed is t6–t2. This is a conservative approximation of the precise ub, which would be the time when the watermark is advanced to a time tw, where tw is greater than or equal to t1.

Figure 10:
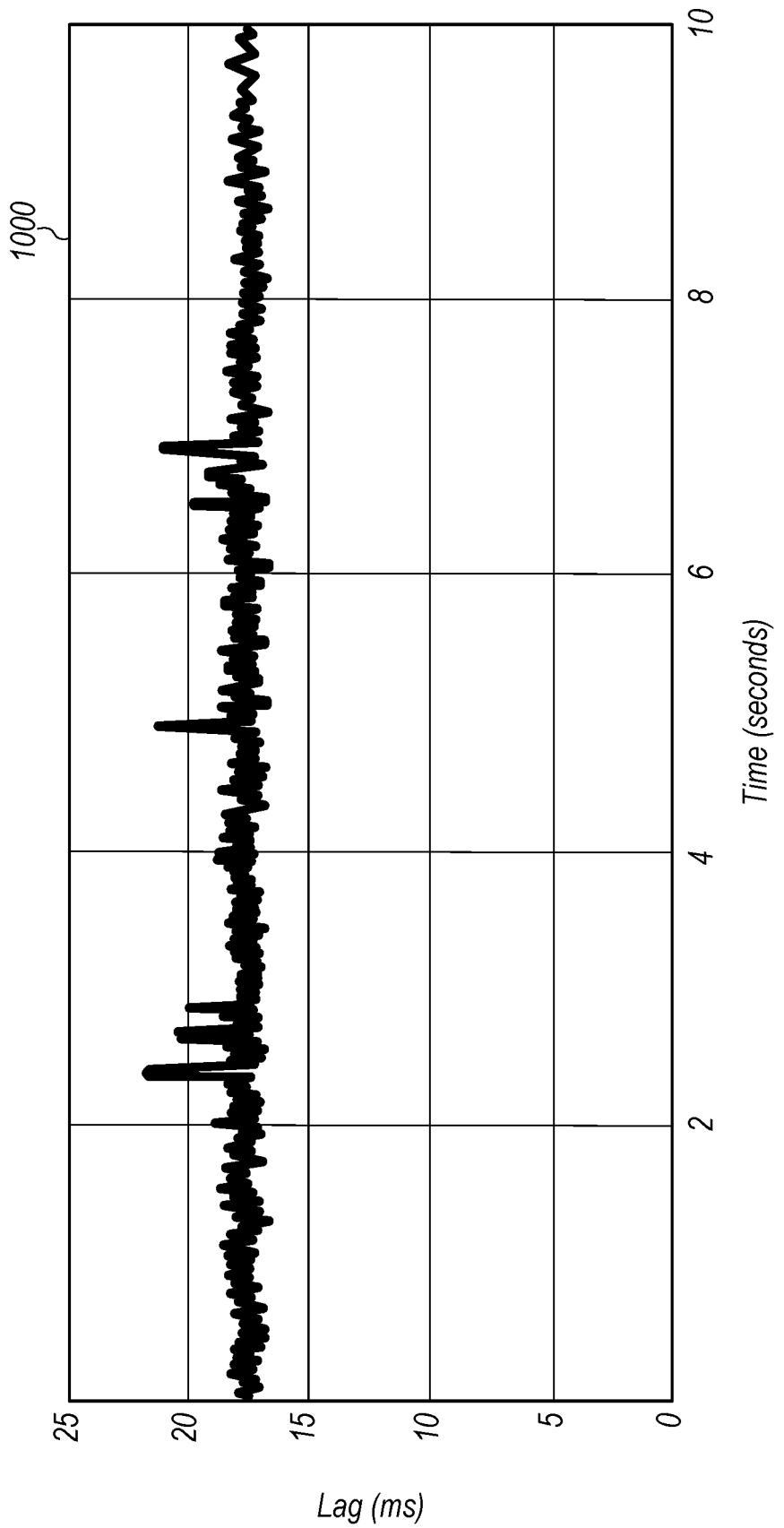
FIG. 10 illustrates the upper bound of the lag (when measured using a cluster of 32 shards over a period of 10 seconds), according to some embodiments.

FIG. 10 illustrates the upper bound 1000 of the lag (when measured using a cluster of 32 shards over a period of 10 seconds), according to some embodiments. The primary site was run at its peak write throughput during this experiment. The average value of the upper bound is approximately 17.68 milliseconds and the maximum value is approximately 21.57 milliseconds. The minimum upper bound that can be achieved is lb, which is approximately 13.05. This indicates that SysDR manages to keep the lag in a tight range of approximately 4.7 to 8.5 milliseconds in the test runs.

In some embodiments, the above results are largely dominated by network latencies between the data centers hosting the primary and backup stores, as well as intra data center network latencies involved at the backup site to advance the global watermark. The backup site's lag may ordinarily fall between the upper and lower bounds. These bounds simply provide a feasible means to estimate the common case lag of the backup site. However, they do not reflect the worst case bound for the lag, which can be triggered by certain rare scenarios such as failure of a shard's leader on the primary or backup site. Another interesting observation to note is that the lag's reported lower bound lb is a conservative approximation of the actual lower bound. In practice a BACKUP request that leaves the primary site's failure domain (just the primary site's data center) can make it to the backup site even if the primary data center fails. Thus the ideal lower bound would be the latency of the BACKUP request to exit the primary data center's failure domain. That latency could not be directly measured, and hence a conservative estimate was reported.

CONCLUSION

In embodiments, SysDR provides correct backup of a linearizable distributed data store with a tiny, millisecond-scale lag. SysDR backs up the data store continuously by asynchronously shipping log records of individual shards to the backup site. Asynchrony ensures that SysDR does not lead to any overheads (or minimizes any overhead) in the data store's client-facing critical path. SysDR uses synchronized distributed clocks to enable the backup site to apply distributed log records in the correct order. It also uses a watermark service to efficiently detect the time when received log records can be applied to the backup site. Empirical results confirm the expectation that the backup data store's state closely trails the primary data store's state—13.01 to 21.57 in experiments using an example embodiment.

Figure 12:
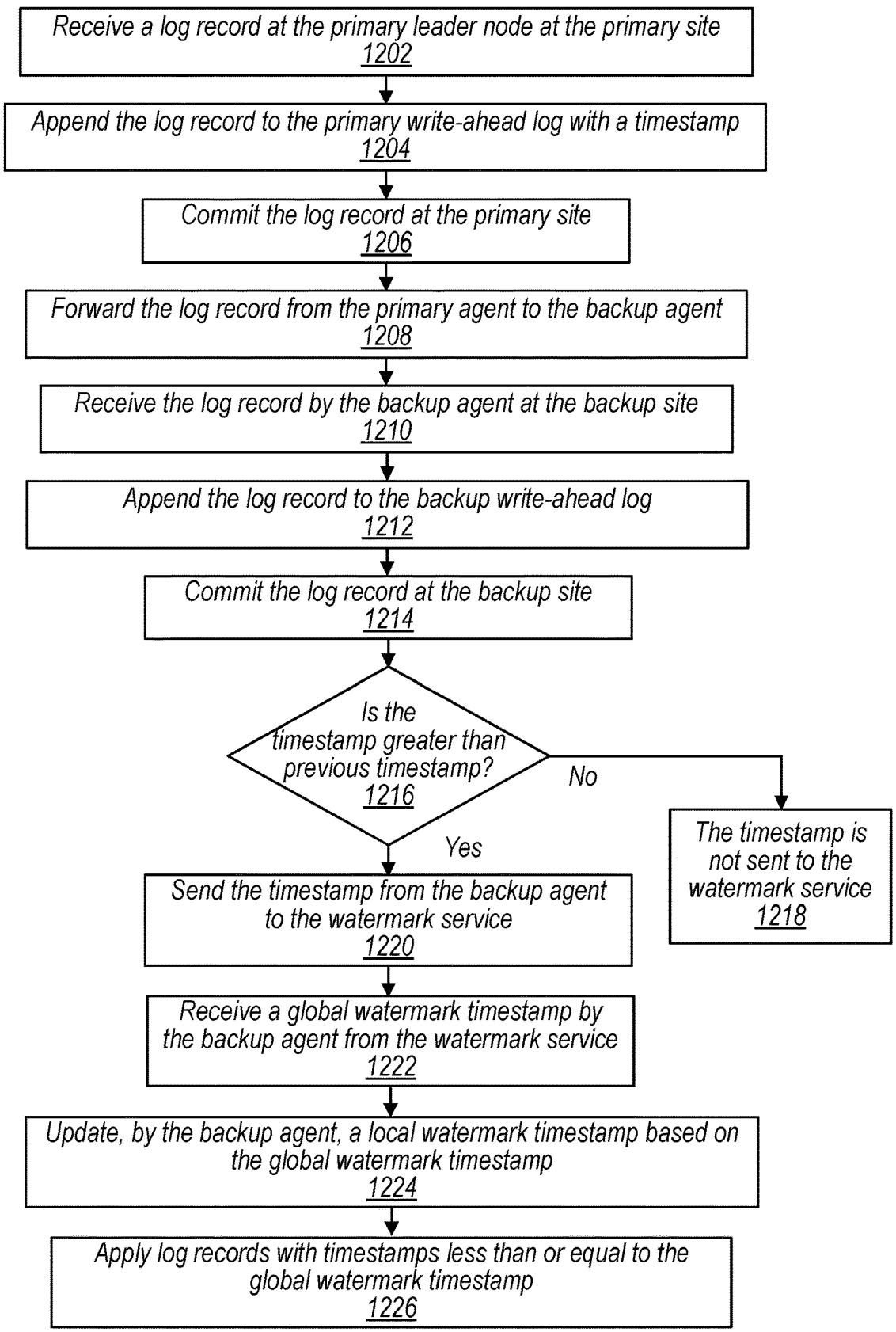
FIG. 12 is a flow diagram illustrating a backup process for a data store that implements scalable low-loss disaster recovery, according to some embodiments.

FIG. 12 is a flow diagram illustrating a backup process for a data store that implements scalable low-loss disaster recovery, according to some embodiments.

The process begins at operation 1202, where a primary leader node (e.g., at the primary site) receives a log record. At operation 1204, the primary leader node appends the log record to the primary write-ahead log with a timestamp. At operation 1206, the primary leader node commits the log record. At operation 1208, the primary agent forwards the log record to the backup agent at the backup leader node (e.g., at the backup site).

At operation 1210, the backup agent receives the log record. At operation 1212, the backup leader node appends the log record to the backup write-ahead log. At operation 1214, the backup leader node commits the log record. At operation 1216, the backup agent determines whether the timestamp of the log record is greater than the timestamp of a log record that was previously committed by the backup leader node (e.g., the most recently committed record before the log record that was just committed). If not, then at operation 1218, the backup agent determines not to send the timestamp of the log record to the watermark service.

If the backup agent determines that the timestamp of the log record is greater than the timestamp of a log record that was previously committed by the backup leader node, then at operation 1220, the backup agent sends the timestamp to the watermark service. At operation 1222, the backup agent receives the global watermark timestamp from the watermark service. At operation 1224, the backup agent updates a local watermark timestamp based on the received global watermark timestamp (e.g., updates to the more recent time value of the global watermark timestamp). At operation 1226, the backup leader node applies log records with timestamps less than or equal to the global watermark timestamp.

Figure 13:
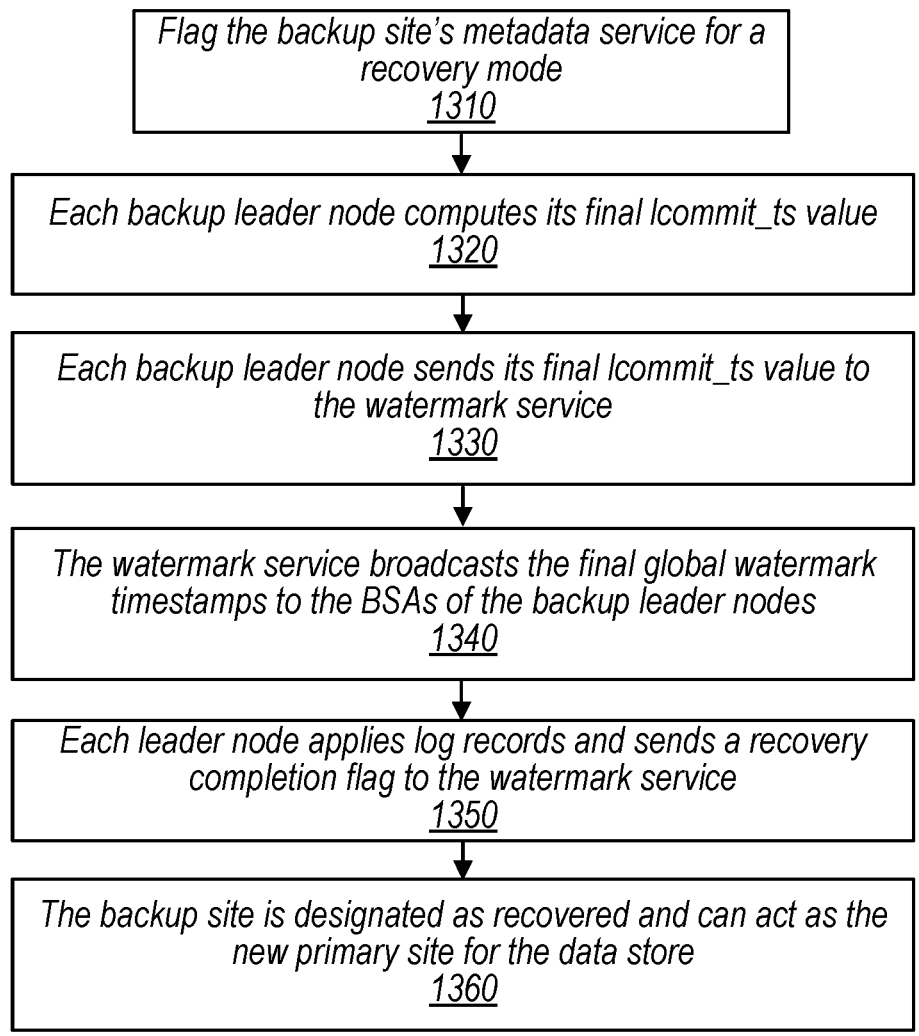
FIG. 13 is a flow diagram illustrating a process of implementing scalable low-loss disaster recovery for a data store, according to some embodiments.

FIG. 13 is a flow diagram illustrating a process of implementing scalable low-loss disaster recovery for a data store, according to some embodiments.

The process begins at operation 1310, where an administrator flags the backup site's metadata service for a recovery mode. In some embodiments, an application (e.g., a monitoring service running at the primary site and/or backup site) detects one or more failures at the primary site (e.g., one or more shards or replicas fail) and in response, the application flags the site's metadata service for a recovery mode. As discussed herein, each backup replica (e.g., backup node) may periodically ping the backup metadata service to determine its health. If the metadata service responds with a RECOVERY flag, the replica knows that recovery from a disaster is in progress. If the replica happens to be the leader of a shard, it must compute its final lcommit-ts value, and send it to the watermark service (the leader also marks its message as the final message). Therefore, at operation 1320, each backup leader node computes its final lcommit-ts value.

At operation 1330, each backup leader node sends the final lcommit-ts value to the watermark service. At operation 1340, the watermark service broadcasts the final global watermark timestamps to the BSAs of the backup leader nodes. At operation 1350, each leader node applies log records (e.g., log records with timestamps less than or equal to the received global watermark timestamp) and sends a recovery completion flag to the watermark service. At operation 1360, the backup site is designated as recovered and can act as the new primary site for the data store.

Figure 14:
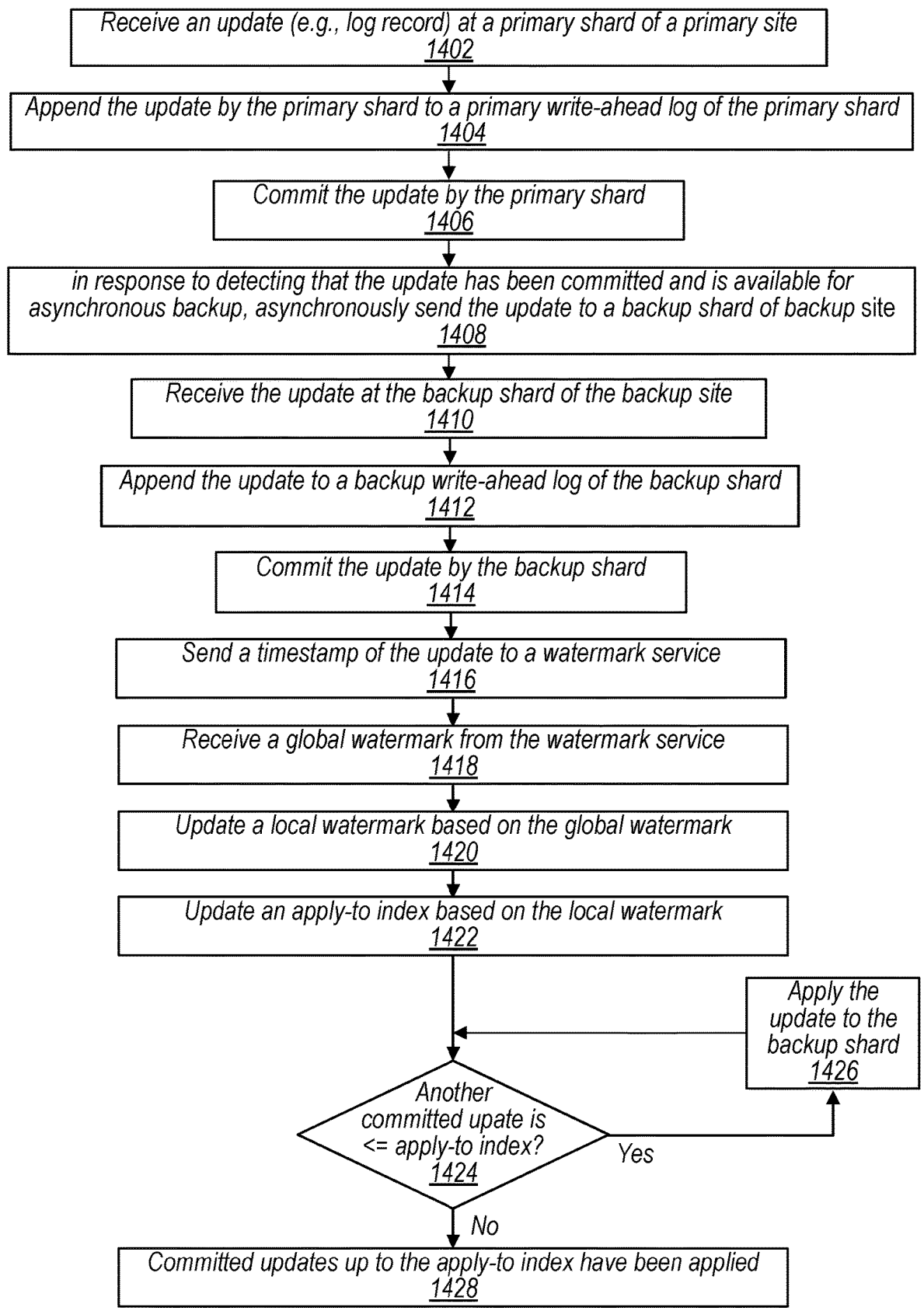
FIG. 14 is a flow diagram illustrating a backup process for a data store that implements scalable low-loss disaster recovery, according to some embodiments.

FIG. 14 is a flow diagram illustrating a backup process for a data store that implements scalable low-loss disaster recovery, according to some embodiments.

The process begins at operation 1402, where a primary shard (e.g., leader node of the primary shard) of a primary site receives an update (e.g., a log record). At operation 1404, the primary shard appends the update to a primary write-ahead log of the primary shard. In embodiments, the appending may include adding a timestamp to the update. As described herein, the timestamp may indicate a time returned by a global clock for the primary site (e.g., used by the different shards of the primary site), and a maximum clock drift for the global clock is less than a completion time to write a given update to the primary shard and at least a threshold number of replicas of the primary shard as part of a given commit (e.g., the threshold number may be required for consensus/commit of the update).

At operation 1406, the primary shard commits the update. In embodiments, to commit the update, the primary shard replicates the update to at least a threshold number of replicas of the primary shard. At operation 1408, in response to detecting that the update has been committed and is available for asynchronous backup, the primary shard asynchronously sends the update to a backup shard of a backup site.

At operation 1410, the backup shard receives the update. At operation 1412, the backup shard appends the update to a backup write-ahead log of the backup shard. At operation 1414, the backup shard commits the update. At operation 1416, the backup shard may send a timestamp of the update to a watermark service (e.g., in response to determining that the timestamp of the update is greater than another timestamp of another update that was previously committed at the backup shard).

At operation 1418, the backup shard receives a global watermark timestamp from the watermark service. At operation 1420, the backup shard updates a local watermark timestamp based on the received global watermark timestamp (e.g., updates the local watermark timestamp to be the more recent time value of the global watermark timestamp). At operation 1422, the backup shard applies updates an apply-to index based on the updated local watermark timestamp. In embodiments, the updated apply-to index indicates the index (e.g., an integer value) of a latest update committed by the backup shard (but not yet applied) that has a timestamp less than or equal to the local watermark.

After operation 1422, the backup shard may apply the update (and possibly one or more other updates) committed by the backup shard based on the updated apply-to index. In embodiments, at operation 1424, the backup shard determines whether there is another committed update (not yet applied) that has an index less than or equal to the updated apply-to index (e.g., whether there is another committed update with a timestamp less than or equal to the received global watermark timestamp/local watermark). If so, then at operation 1426, the backup shard applies the update to the backup shard and then returns to operation 1424. If not, then at operation 1428, the committed updates with an index up to the updated apply-to index (less than or equal to the updated apply-to index) have been applied.

As any number of additional updates continued to be received (e.g., from a client of the distributed database), then some or all of the above operations (1402-1428) by repeat any number of times for the additional updates. For example, subsequent to commits of one or more other updates at the backup shard, the backup shard may receive another global watermark timestamp. The other global watermark timestamp may be greater than the global watermark timestamp and wherein may indicate a subsequent time up to which all of the backup shards have committed updates (e.g., each of the backup shards have committed one or more additional updates with a later/subsequent timestamp). The backup shard may determine that timestamps of the one or more other updates are less than or equal to the other global watermark timestamp. In response to the determination that the timestamps of the one or more other updates are less than or equal to the other global watermark timestamp, the backup shard may apply the one or more other updates to the backup shard.

Figure 15:
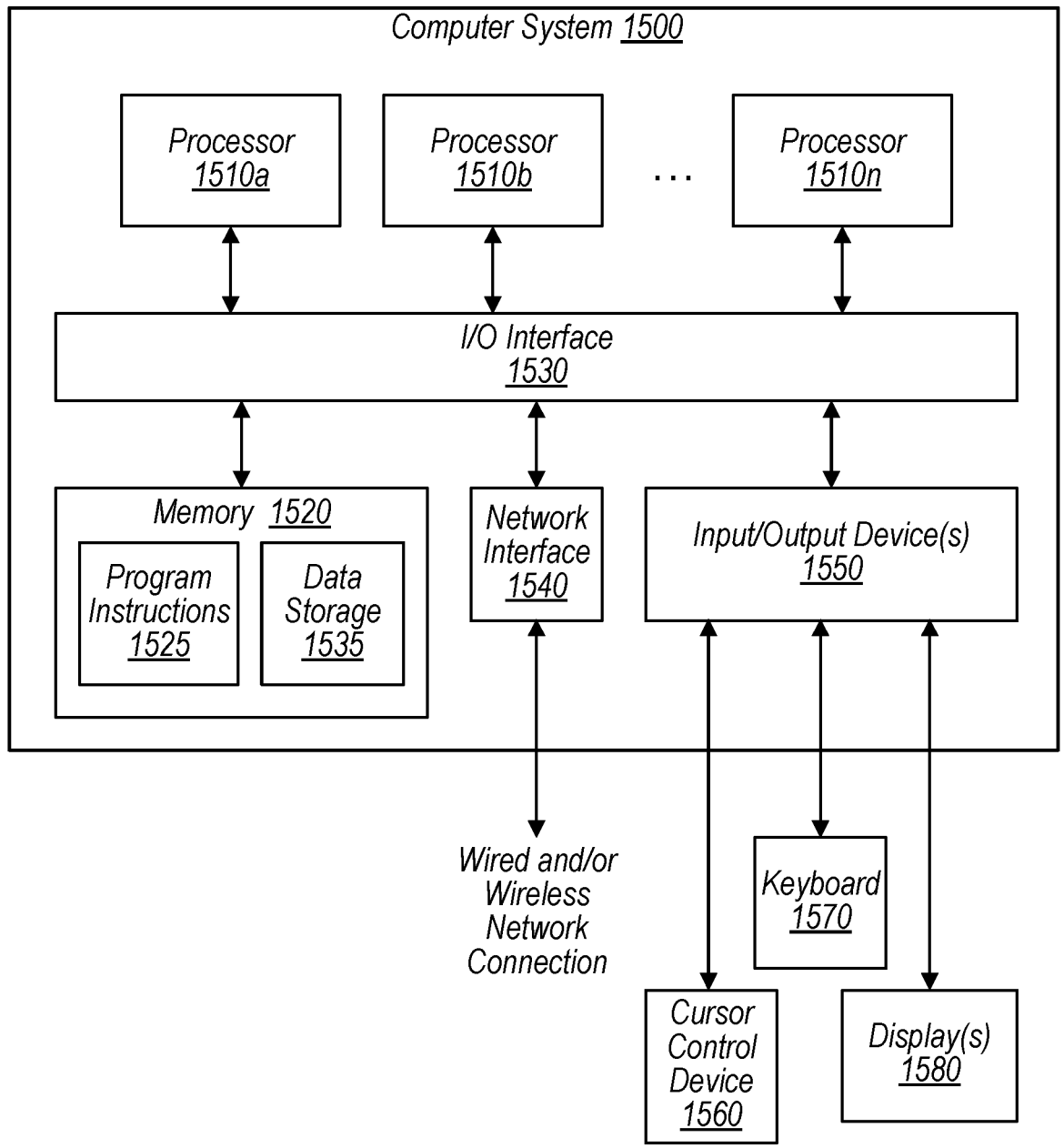
FIG. 15 is a block diagram illustrating a computer system that may be used to implement one or more portions of a system that employs scalable low-loss disaster recovery for a data store, according to some embodiments.

Various computer systems may be used to implement components of embodiments of the techniques and methods described herein for implementing scalable low-loss disaster recovery for a data store (e.g., SysDR). One such computer system or computing device is illustrated by FIG. 15. In the illustrated embodiment, computer system 1500 includes one or more processors 1510 coupled to a system memory 1520 via an input/output (I/O) interface 1530. Computer system 1500 further includes a network interface 1540 coupled to I/O interface 1530, and one or more input/output devices 1550, such as cursor control device 1560, keyboard 1570, and display(s) 1580. In some embodiments, it is contemplated that embodiments may be implemented using a single instance of computer system 1500, while in other embodiments multiple such systems, or multiple nodes making up computer system 1500, may be configured to host different portions, components, or instances of embodiments. For example, in one embodiment some elements may be implemented via one or more nodes of computer system 1500 that are distinct from those nodes implementing other elements.

In various embodiments, computer system 1500 may be a uniprocessor system including one processor 1510, or a multiprocessor system including several processors 1510 (e.g., two, four, eight, or another suitable number). Processors 1510 may be any suitable processor capable of executing instructions. For example, in various embodiments, processors 1510 may be general-purpose or embedded processors implementing any of a variety of instruction set architectures (ISAs), such as the x86, PowerPC, SPARC, or MIPS ISAs, or any other suitable ISA. In multiprocessor systems, each of processors 1510 may commonly, but not necessarily, implement the same ISA.

In some embodiments, at least one processor 1510 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of graphical algorithms. For example, a graphics processor may implement a number of graphics primitive operations in a way that makes executing them much faster than drawing directly to the screen with a host central processing unit (CPU). The GPU(s) may implement one or more application programmer interfaces (APIs) that permit programmers to invoke the functionality of the GPU(s).

System memory 1520 may be configured to store program instructions and/or data accessible by processor 1510. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for various embodiments of methods for implementing scalable low-loss disaster recovery for a data store as illustrated in FIGS. 1 through 13, are shown stored within system memory 1520 as program instructions 1525 and data storage 1535, respectively. In other embodiments, program instructions and/or data may be received, sent or stored upon different types of computer-accessible media or on similar media separate from system memory 1520 or computer system 1500. Generally speaking, a computer-accessible medium may include storage media or memory media such as magnetic or optical media, e.g., disk or CD/DVD-ROM coupled to computer system 1500 via I/O interface 1530. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1540.

In one embodiment, I/O interface 1530 may be configured to coordinate I/O traffic between processor 1510, system memory 1520, and any peripheral devices in the device, including network interface 1540 or other peripheral interfaces, such as input/output devices 1550. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. In addition, in some embodiments some or all of the functionality of I/O interface 1530, such as an interface to system memory 1520, may be incorporated directly into processor 1510.

Network interface 1540 may be configured to allow data to be exchanged between computer system 1500 and other devices attached to a network, such as other computer systems, or between nodes of computer system 1500. In various embodiments, network interface 1540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1550 may, in some embodiments, include one or more display terminals, keyboards, keypads, touchpads, scanning devices, voice or optical recognition devices, or any other devices suitable for entering or retrieving data by one or more computer system 1500. Multiple input/output devices 1550 may be present in computer system 1500 or may be distributed on various nodes of computer system 1500. In some embodiments, similar input/output devices may be separate from computer system 1500 and may interact with one or more nodes of computer system 1500 through a wired or wireless connection, such as over network interface 1540.

As shown in FIG. 15, memory 1520 may include program instructions 1525, configured to implement embodiments of the methods for providing scalable low-loss disaster recovery for a data store, and data storage 1535, comprising various data accessible by program instructions 1525. In one embodiment, program instructions 1525 may include software elements of embodiments of the methods for providing scalable low-loss disaster recovery for a data store, as illustrated in the above Figures. Data storage 1535 may include data that may be used in embodiments. In other embodiments, other or different software elements and data may be included.

Those skilled in the art will appreciate that computer system 1500 is merely illustrative and is not intended to limit the scope of the methods for providing scalable low-loss disaster recovery for a data store as described herein. In particular, the computer system and devices may include any combination of hardware or software that can perform the indicated functions, including computers, network devices, internet appliances, PDAs, wireless phones, pagers, etc.

Computer system 1500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1500 may be transmitted to computer system 1500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Figure 16:
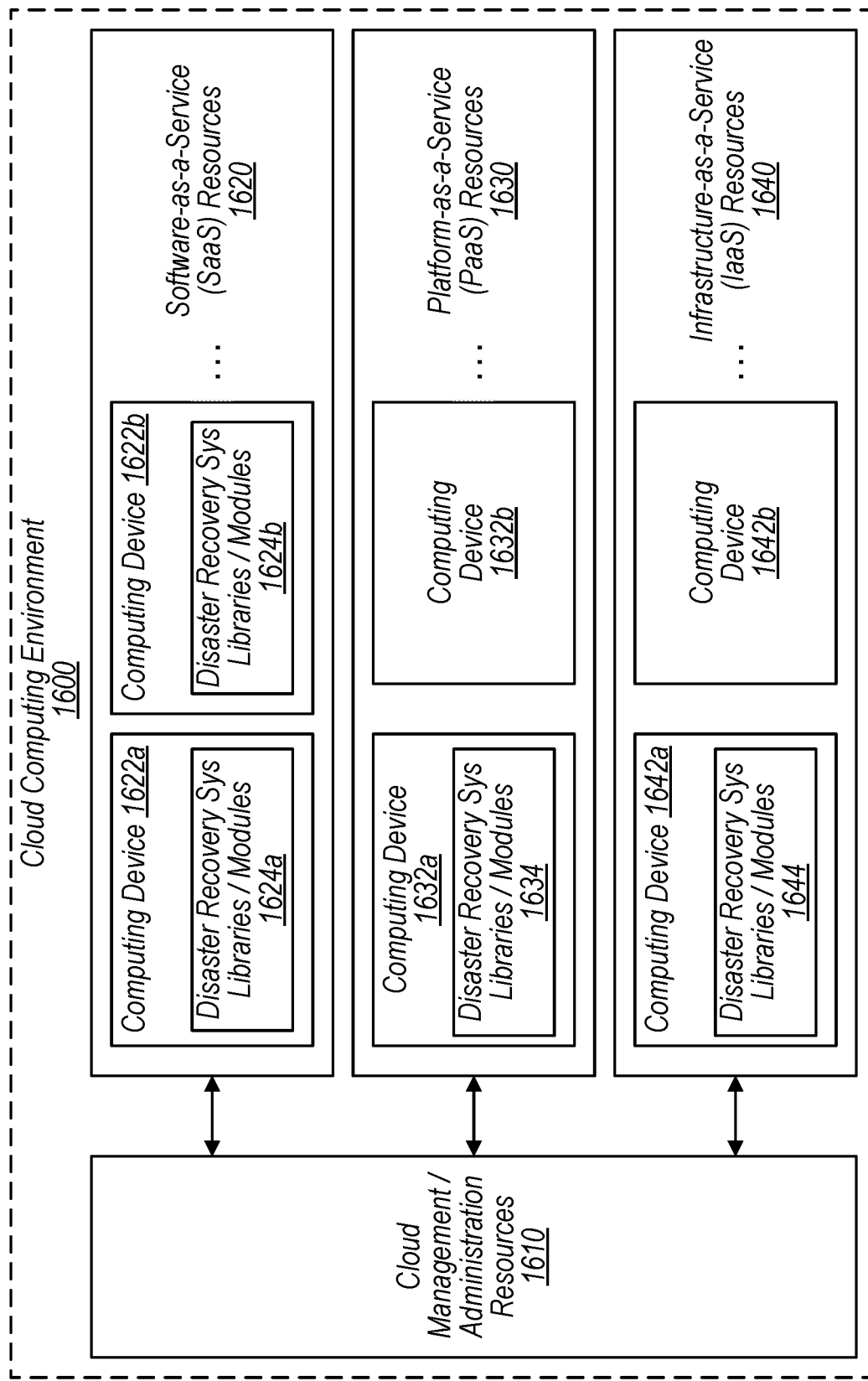
FIG. 16 illustrates an example cloud computing environment in which a system that uses scalable low-loss disaster recovery for a data store may be implemented, according to some embodiments.

FIG. 16 illustrates an example cloud computing environment in which some or all of the above techniques for scalable low-loss disaster recovery for a data store may be implemented, according to some embodiments.

As shown, cloud computing environment 1600 may include cloud management/administration resources 1610, software-as-a-service (SaaS) resources 1620, platform-as-a-service (PaaS) resources 1630 and/or infrastructure-as-a-service (IaaS) resources 1640. Individual ones of these subcomponents of the cloud computing environment 1600 may include a plurality of computing devices (e.g., devices similar to device 1400 shown in FIG. 15) distributed among one or more data centers (e.g., primary site, backup site, etc.) in the depicted embodiment, such as devices 1622*a*, 1622*b*, 1632*a*, 1632*b*, 1642*a*, and 1642*b*. A number of different types of network-accessible services, such as database services, customer-relationship management services, machine learning services and the like may be implemented using the resources of the cloud computing environment in various embodiments.

In the depicted embodiment, clients or customers of the cloud computing environment 1600 may choose the mode in which they wish to utilize one or more of the network-accessible services offered. For example, in an IaaS mode, in some embodiments, the cloud computing environment may manage virtualization, servers, storage and networking on behalf of the clients, but the clients may have to manage operating systems, middleware, data, runtimes, and applications. If, for example, a client wishes to use IaaS resources 1640 for some desired application for which disaster recovery systems (e.g., SysDR) of the kind described above (e.g. primary shard 402, backup shard 404, watermark service 406, etc.) are used, the clients may identify one or more virtual machines implemented using computing devices 1642 (e.g., 1642*a* or 1642*b*) as the platforms on which the applications are being run, and ensure that the appropriate disaster recovery system libraries and/or modules 1644 are installed and available on those virtual machines. In some embodiments, in a PaaS mode, clients may be responsible for managing a smaller subset of the software/hardware stack in various embodiments: e.g., while the clients may still be responsible for application and data management, the cloud environment may manage virtualization, servers, storage, network, operating systems as well as middleware. Disaster recovery system libraries/modules such as libraries and/or modules 1634 may be pre-deployed to, and run at, at least some PaaS resources (e.g., 1632*a*, 1632*b*, etc.) for applications on various clients in different embodiments. In some embodiments, in a SaaS mode, the cloud computing environment may offer applications as a pre-packaged service (including the disaster recovery system components such as 1624*a* and/or 1624*b*), managing even more of the software/hardware stack in various embodiments. For example, clients in a SaaS mode may not even have to explicitly manage applications or data.

In some embodiments, the administration resources 1610 may perform resource management-related operations (such as provisioning, network connectivity, ensuring fault tolerance and high availability, and the like) for all the different modes of cloud computing that may be supported in some embodiments. Clients may interact with various portions of the cloud computing environment 1600 using a variety of programmatic interfaces in different embodiments, such as a set of APIs (application programming interfaces), web-based consoles, command-line tools, graphical user interfaces and the like. Note that other modes of providing services at which the disaster recovery system as described above may be supported in at least some embodiments, such as hybrid public-private clouds, and the like.

The various methods as illustrated in the figures and described herein represent examples of embodiments of methods. The methods may be implemented in software, hardware, or a combination thereof. The order of the methods may be changed, and various elements may be added, reordered, combined, omitted, modified, etc.

Although the embodiments above have been described in considerable detail, numerous variations and modifications will become apparent to those skilled in the art once the above disclosure is fully appreciated. In addition, although this disclosure describes particular types of disaster recovery techniques, it should be understood that these details may be implemented differently in other embodiments and contexts, and in some instances optional. In general, the teachings of this disclosure are provided in terms of examples, which are used to explain the inventive concepts presented herein. These examples do not limit the inventive concepts.

What is claimed is:

1. A system, comprising:
a plurality of computing devices comprising respective processors and memory to implement a backup site, the backup site configured to:
receive, at a backup shard from a primary shard of a remote network of a primary site, an update, wherein the backup site comprises a plurality of backup shards and associated shard replicas, and wherein the update comprises a timestamp;
append the update to a backup log of the backup shard;
commit the update;

determine a global watermark timestamp, wherein the global watermark timestamp indicates a time up to which all of the backup shards have committed updates; and apply the update to the backup shard based on the global watermark timestamp, wherein the timestamp of the update is less than or equal to the global watermark timestamp.

2. The system of claim 1, wherein to determine the global watermark timestamp, the backup shard is further configured to:
determine that the timestamp of the update is greater than a previous timestamp of another update that was previously committed at the backup shard;
in response to the determination that the timestamp of the update is greater than the previous timestamp, send the timestamp of the update to a watermark service; and
receive, from the watermark service, the global watermark timestamp.

3. The system of claim 1, wherein to apply the update to the backup shard, the backup shard is further configured to:
determine that the timestamp of the update is less than or equal to the global watermark timestamp; and
in response to the determination that the timestamp of the update is less than or equal to the global watermark timestamp, apply the update to the backup shard.

4. The system of claim 3, wherein the backup shard is further configured to:
subsequent to commits of one or more other updates at the backup shard, receive another global watermark timestamp, wherein the other global watermark timestamp is greater than the global watermark timestamp, and wherein the other global watermark timestamp indicates a subsequent time up to which all of the of backup shards have committed updates;
determine that timestamps of the one or more other updates are less than or equal to the other global watermark timestamp; and
in response to the determination that the timestamps of the one or more other updates are less than or equal to the other global watermark timestamp, apply the one or more other updates to the backup shard.

5. The system of claim 4, wherein the timestamps of the one or more other updates are greater than the global watermark timestamp.

6. The system of claim 1, wherein the backup shard is further configured to:
in response to the reception of the update from the primary shard, send, from the backup shard to the primary shard, an indication that the update will be appended at the backup shard.

7. The system of claim 1, wherein the backup shard is further configured to:
in response to the commitment of the update, send, to the primary shard, an indication that the update has been committed.

8. A method, comprising:
performing, by one or more computing devices of a backup site:
receiving, at a backup shard from a primary shard of a remote network of a primary site, an update, wherein the backup site comprises a plurality of backup shards and associated shard replicas, and wherein the update comprises a timestamp;
appending the update to a backup log of the backup shard;
committing the update;

determining a global watermark timestamp, wherein the global watermark timestamp indicates a time up to which all of the backup shards have committed updates; and
applying the update to the backup shard based on the global watermark timestamp, wherein the timestamp of the update is less than or equal to the global watermark timestamp.

9. The method of claim 8, wherein applying the update to the backup shard comprises:
determining that the timestamp of the update is less than or equal to the global watermark timestamp; and
in response to determining that the timestamp of the update is less than or equal to the global watermark timestamp, applying the update to the backup shard.

10. The method of claim 8, wherein applying the update to the backup shard further comprises:
receiving, from a watermark service, the global watermark timestamp;
updating a local watermark based on the global watermark timestamp;
updating an apply-to index based on the local watermark, wherein the updated apply-to index indicates a latest update committed by the backup shard with a timestamp less than or equal to the local watermark; and
applying the update and one or more other updates committed by the backup shard based on the updated apply-to index.

11. The method of claim 8, further comprising:
sending the timestamp of the update to a watermark service; and
subsequent to sending the timestamp of the update to the watermark service, receiving, from the watermark service, the global watermark timestamp.

12. The method of claim 8, further comprising:
receiving, at the backup shard, an additional update; and
sending, from the backup shard to the primary shard, an indication that the additional update was received out-of-order, wherein the indication indicates a last log record that the backup shard received in a correct order.

13. The method of claim 8, further comprising:
in response to receiving the update from the primary shard, sending, from the backup shard to the primary shard, an indication that the update will be appended at the backup shard.

14. The method of claim 8, further comprising:
in response to the committing the update by the backup shard, sending, from the backup shard to the primary site, an indication that the update has been committed.

15. One or more non-transitory computer-accessible storage media storing program instructions that when executed on or across one or more processors of a backup site cause the one or more processors to:
receive, at a backup shard from a primary shard of a remote network of a primary site, an update, wherein the backup site comprises a plurality of backup shards and associated shard replicas, and wherein the update comprises a timestamp;
append the update to a backup log of the backup shard;
commit the update;
determine a global watermark timestamp, wherein the global watermark timestamp indicates a time up to which all of the backup shards have committed updates; and apply the update to the backup shard based on the global watermark timestamp, wherein the timestamp of the update is less than or equal to the global watermark timestamp.

16. The one or more storage media as recited in claim 15, wherein to determine the global watermark timestamp, the program instructions when executed on or across the one or more processors cause the one or more processors to:
  determine that the timestamp of the update is greater than a previous timestamp of another update that was previously committed at the backup shard;
  in response to the determination that the timestamp of the update is greater than the previous timestamp, send the timestamp of the update to a watermark service; and
  receive, from the watermark service, the global watermark timestamp.

17. The one or more storage media as recited in claim 15, wherein to apply the update to the backup shard, the program instructions when executed on or across the one or more processors cause the one or more processors to:
  determine that the timestamp of the update is less than or equal to the global watermark timestamp; and
  in response to the determination that the timestamp of the update is less than or equal to the global watermark timestamp, apply the update to the backup shard.

18. The one or more storage media as recited in claim 15, further comprising program instructions that when executed on or across the one or more processors cause the one or more processors to:
  subsequent to additional commits of one or more other updates at the backup shard, receive another global watermark timestamp, wherein the other global watermark timestamp is greater than the global watermark timestamp, and wherein the other global watermark timestamp indicates a subsequent time up to which all of the of backup shards have committed updates;
  determine that timestamps of the one or more other updates are less than or equal to the other global watermark timestamp; and
  in response to the determination that the timestamps of the one or more other updates are less than or equal to the other global watermark timestamp, apply the one or more other updates to the backup shard.

19. The one or more storage media as recited in claim 15, wherein to determine the global watermark timestamp, the program instructions when executed on or across the one or more processors cause the one or more processors to receive, from a watermark service, the global watermark timestamp, and further comprising program instructions that when executed on or across the one or more processors cause the one or more processors to:
  subsequent to additional commits of one or more other updates at the backup shard, determine that a recovery is in progress; and
  subsequent to the determination that the recovery is in progress:
    apply the one or more other updates to the backup shard; and
    subsequent to the application of the one or more other updates, send a recovery completion flag to the watermark service.

20. The one or more storage media as recited in claim 15, wherein the timestamp indicates a time provided by a clock for the primary site.

\* \* \* \* \*

UNITED STATES PATENT AND TRADEMARK OFFICE
CERTIFICATE OF CORRECTION

| | | |
|---|---|---|
| PATENT NO. | : 12,086,037 B2 | Page 1 of 1 |
| APPLICATION NO. | : 18/338219 | |
| DATED | : September 10, 2024 | |
| INVENTOR(S) | : Marathe et al. | |

It is certified that error appears in the above-identified patent and that said Letters Patent is hereby corrected as shown below:

In the Specification

In Column 2, Line 2, delete "the of" and insert -- the --, therefor.

In Column 6, Line 55, delete "packet" and insert -- packet. --, therefor.

In Column 15, Line 13, delete "The" and insert -- the --, therefor.

In Column 18, Line 45, delete "site" and insert -- site. --, therefor.

In the Claims

In Column 29, Line 34, in Claim 4, delete "the of" and insert -- the --, therefor.

In Column 32, Line 3, in Claim 18, delete "the of" and insert -- the --, therefor.

Signed and Sealed this
Seventh Day of January, 2025

Derrick Brent
*Acting Director of the United States Patent and Trademark Office*